(12) United States Patent
Guler et al.

(10) Patent No.: US 7,493,280 B2
(45) Date of Patent: *Feb. 17, 2009

(54) METHOD AND SYSTEM FOR SETTING AN OPTIMAL RESERVE PRICE FOR AN AUCTION

(75) Inventors: Kemal Guler, Cupertino, CA (US); Tongwei Liu, Redwood City, CA (US); Hsiu-Khuern Tang, Menlo Park, CA (US); Kay-Yut Chen, Sunnyvale, CA (US); Fereydoon Safai, Los Altos Hills, CA (US); Ren Wu, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1642 days.

This patent is subject to a terminal disclaimer.

(21) Appl. No.: 09/902,928

(22) Filed: Jul. 10, 2001

(65) Prior Publication Data

US 2003/0055773 A1  Mar. 20, 2003

(51) Int. Cl.
G06Q 40/00  (2006.01)
(52) U.S. Cl. .......................... 705/37; 705/35
(58) Field of Classification Search ............ 705/37, 705/36 R, 27, 80, 26
See application file for complete search history.

(56) References Cited

U.S. PATENT DOCUMENTS 6,415,270 B1 * 7/2002 Rackson et al. ........... 705/36 R 6,871,190 B1 * 3/2005 Seymour et al. ............ 705/37

FOREIGN PATENT DOCUMENTS

EP  1085445 A1 * 3/2001

OTHER PUBLICATIONS

Bulow et al (The Journal of political economy, vol. 97, No. 5. (Oct. 1989), pp. 1060-1090).*

* cited by examiner

*Primary Examiner*—Thomas A. Dixon
*Assistant Examiner*—Ojo O. Oyebisi

(57) ABSTRACT

One embodiment of the present invention provides a method and system that computes the optimal level of the reserve price for an auction, with respect to a multiplicity of possible evaluation criteria that the end user of the system may specify. In one embodiment, structural elements characterizing the auction situation are estimated from bid data available on past auctions. The estimated structural elements are then used in the formulation of the user's expected payoff as a function of the reserve price. This objective function is then optimized to obtain the best level of the reserve price. In one embodiment, this method is implemented by a process executed on a computer system, under the control of software and firmware directing the operation of its processors and components. In one embodiment, a computer readable medium causes a computer system to execute the steps in a process for implementing the method.

24 Claims, 20 Drawing Sheets

HISTORICAL AUCTION DATA REPOSITORY

Historical Auction Data Repository contains data on past auctions. For the purposes of present invention, we assume that the following variables are observed for each auction in the database.

Auction:
    Auction ID
    Further Auction Characteristics

Auctioned Item:
    Item ID
    Name
    Quantity
    Description
    Further Item Characteristics Mechanism:
    Auction Format
    Reserve price
    Further Mechanism Characteristics Bidders:
    Bidder ID
    Segment ID
    Further Bidder Characteristics Bids:
    Identities of participating bidders
    Bids submitted by participating bidders Outcomes:
    Assigned payments for each bidder
    Assigned quantities for each bidder

FIGURE 11.A

AUCTION CHARACTERISTICS:

- Auction ID
- Item ID
- Item Name
- Quantity
- Dates:
    - Announcement
    - Start
    - Close
- Seller/Buyer ID
- Auction Mechanism Characteristics
- Invited Bidders' IDs
- Participating Bidders' IDs and Bids, Quantities
- Outcome:
    - Assigned Price for each bidder
    - Assigned Quantities for each bidder
- Fees:
    - Shipping & Handling
    - Taxes
    - Auctioneer Fees:
        - Posting Fee
        - Ad Valorem Fee

FIGURE 11.B

BIDS:

Bid ID

Auction ID

Item ID

Bidder ID

Bid Time Stamp

Price Bid

Bid Type

Proxy

Direct

Quantity Desired

Minimum Quantity

Currency

FIGURE 11.C

MECHANISM CHARACTERISTICS:

Format
- English
- Dutch
- Sealed Bid First Price
- Sealed Bid Second Price
- Vickrey
- etc Buy/Sell Entry Rule
- Open
  - Free
  - Fee
- Invitation
  - Free
  - Fee Reserve Price
- Secret
- Open Start Price Bid Increment
- Fixed
- Relative Closing Rule
- Inactivity Time
- Fixed Closing Time

FIGURE 11.D

ITEM CHARACTERISTICS:

- Item ID
- Name
- Description
- Location
- SKU
- Manufacturer
- Model Number
- Condition
- Warranty
- Weight
- Weight Unit
- Measurement Unit
- Currency
- List Price
- etc

FIGURE 11.E

BIDDER CHARACTERISTICS:

ID

Segment ID

Name

Address

General Information

Socio Demographic Information

Etc

SELLER/BUYER CHARACTERISTICS:

Seller/Buyer ID

Name

Address

General Information

Socio Demographic Information

Etc

Seller input

| | | |
|---|---|---|
| 1201 | Product: | ABlueCar |
| 1202 | Quantity: | |
| 1203 | Seller's Valuation: | |
| 1204 | Evaluation Criterion: | Expected profit |
| 1205 | Auction Format: | English |
| 1206 | Number of Bidders: | 1 |
| 1207 | Reserve Price Range: | [ ] TO [ ] |

Submit  Reset
  /       /
1208    1209

FIGURE 12

1300    RESERVE PRICE REPORT

1310    INPUTS:

| Product: | ABlueCar |
|---|---|
| Quantity: | 1 |
| Seller's Valuation: | $10 |
| Evaluation Criterion: | Expected Profit |
| Auction Format: | Sealed-bid first-price |
| Number of Bidders: | 5 |
| Reserve Price Range: | $0 TO $100 |

1320    RESULTS:

| | | | | | |
|---|---|---|---|---|---|
| 1321 | Reserve price (in dollars) | 0 | 10 | 20 | 30 | ... |
| 1322 | Expected payoff (in dollars) | 60 | 75 | 80 | 70 | ... |
| 1323 | Standard deviation of payoff (in dollars) | 15 | 17 | 20 | 25 | ... |

1330

| OPTIMAL DECISION: | |
|---|---|
| Optimal Reserve Price: | $20 |
| Expected Payoff: | $80 |
| Standard Deviation of Payoff: | $20 |

FIGURE 13

METHOD AND SYSTEM FOR SETTING AN OPTIMAL RESERVE PRICE FOR AN AUCTION

BACKGROUND OF THE INVENTION

1. Field of Invention

The present invention pertains to automated design and analysis of auctions. More particularly, this invention relates to a method and system for setting an optimal reserve price for an auction.

2. Related Art

A seller who wishes to sell an item, or a set of items, by running an auction has to make a number of decisions. First, he has to choose a format from among a number of alternative formats: English, Dutch, Vickrey, sealed-bid first-price to name a few common formats. Then he has to decide the levels of a number of parameters: reserve price, bid increment, entry fees, lot size etc. A reserve price in an auction for selling an item is the minimum price below which no bids are accepted. If all the submitted bids are below the reserve price, then no sale occurs. Alternative combinations of these decisions typically yield different outcomes from the seller's point of view.

Similarly, a buyer who wishes to purchase an item, or a set of items, by running an auction also has to make a number of decisions. He has to choose a format from among a set of alternative formats. Common auction formats used in purchasing an item include the appropriately modified versions of English, Dutch, Vickrey and sealed-bid first-price auctions. The buyer also has to make decisions on the levels of a number of parameters: reserve price, bid decrement, entry fees, lot size, etc. A reserve price in an auction for purchasing an item is the maximum price above which no bids are accepted. If all the submitted bids are above the reserve price, then no purchase occurs. Alternative combinations of these decisions typically yield different outcomes from the buyer's point of view.

Whether or not a given combination of decisions is better than an alternative combination depends on the specifics of the auction environment. Auction environments are characterized by a number of factors. Some of these factors are observable by the decision-maker and some are inherently unobservable. For example, a seller conducting an auction to sell an item may know the number of potential bidders, but the willingness-to-pay (valuation) of a bidder for the item is typically known by the bidder himself. From the point of view of the seller, the valuation of a bidder is uncertain, or random. Similarly, the bidders' attitudes towards risk and the distribution of bidders' private information affect the bidding behavior and thus the outcome of the auction.

Currently, the decision on the reserve price is left entirely to the person conducting the auction. The reserve price decision is currently guided by rules of thumb, and is error prone. There is little systematic data analysis to guide these decisions. Given the multiplicity of items bought and sold through auctions, it is typically too costly to hire expert analysts to configure the auction procedures for each case. In many markets the factors that affect the auction outcomes, and hence the appropriate reserve price, are seldom fixed, and thus a reserve price which is fixed once-and-for-all is often the wrong one. This invention provides an integrated data collection, modeling, estimation and optimization solution for selecting the reserve price optimally based on structural econometric analysis of available data. Thus, this invention makes it possible for a seller (buyer) to dynamically change the reserve price in response to changing situations.

This invention proposes a system that provides automated decision support for selecting the best reserve price based on structural analysis of data from related auctions to determine the latent elements of the auction environment taking into account the strategic and information conditions with minimal assumptions on the distributions of unobserved random elements.

A seller conducting an auction to sell an item(s) can improve the auction outcome in his favor by selecting the reserve price based on the characteristics of the bidders. Similarly, a buyer conducting an auction to procure an item(s) can improve his expected procurement cost by selecting the reserve price based on the characteristics of the bidders. Bidders' characteristics can be estimated by using structural econometric analysis of bids in past auctions, and the estimated bidder characteristics can be used to estimate the outcomes under alternative levels of the reserve price.

As is known, the outcome of an auction (i.e. who gets what, who pays how much) is determined by bidding behavior of bidders. Bidding behavior depends on, among other factors, the auction rules in that different auction rules induce different behavior on the part of the bidders. A bidder's behavior under a given collection of auction rules in turn is determined by the bidder's private information. The structure of the private information held by the bidders is thus a key factor in evaluating alternative auction rules. This fundamental element of the auction environment is not directly observable and has to be estimated from available data.

Analysis of bidding behavior in auctions and comparison of alternative auction rules in terms of expected outcomes implied by the bidding behavior induced by the bidding rules has been an active area of research in economics. A celebrated result of this body of research is that most common auction formats (including English, sealed-bid first-price, Dutch, Vickrey) are equivalent in terms of expected outcome (expected revenue in the case of a seller, expected procurement cost in the case of a buyer) generated in market environments where the bidders are risk neutral and their private valuations of the item are statistically independent and identically distributed. Furthermore, these auction formats combined with an appropriate reserve price are optimal in the sense that the seller (buyer) cannot achieve a better outcome (expected revenue in the case of a seller, expected procurement cost in the case of a buyer) by using any other selling (buying) procedure. The appropriate reserve price, however, depends on the distribution of bidders' private information. Thus, the well-known theoretical results on optimal reserve price in the economics literature are of little practical use in many decision situations. In particular, the most important factor in the comparison of alternative decisions is the structure of private information of the bidders. This structure is typically unknown by the decision-maker and needs to be estimated from available data. Furthermore, when the said assumptions (risk neutrality, symmetry of bidders, and independence of valuations) are violated, the ranking of alternative auction rules typically depends on the specific structure of valuation distributions and the specific form of the risk attitudes of the bidders. Again, these structural elements of the auction environment are typically unknown by the decision-maker and need to be estimated from available data.

Thus, there exists a need for an automated estimation and optimization solution for selecting the best reserve price. This invention proposes a system that provides automated decision support for selecting the best reserve price based on structural analysis of data from related auctions to determine the latent elements of the auction environment taking into account the strategic and information conditions with minimal assumptions on the distributions of unobserved random elements.

SUMMARY OF THE INVENTION

An embodiment of the present invention provides a method and system that computes the optimal level of the reserve price for the sale of an item by running an auction. Further, an embodiment of the present invention provides a method and a system that computes the optimal level of the reserve price for the purchase of an item by running an auction.

The present invention enables a seller conducting an auction to sell an item(s), or, alternatively, a buyer conducting an auction to procure an item(s), to identify and estimate empirically the unknown elements of the market structure and to factor this information into his decisions regarding the appropriate reserve price to implement in the auction to be conducted.

In one embodiment, the present invention provides a method and system that computes the optimal reserve price with respect to a multiplicity of evaluation criteria that the end user may specify. Structural elements of the characteristics of the auction situation, which may be unobservable directly, are estimated from data available on past auctions. The estimated structural elements are then used to formulate the end user's expected payoff as a function of the decision variable, i.e. the reserve price. This expected payoff function expresses a functional relation between the value of user-specified evaluation criterion and various alternative levels at which the reserve price may be set. This objective function is then optimized to obtain the best level of the reserve price.

This invention provides the decision support tools to select the reserve price based on structural econometric analysis of available data on the market environment This invention allows a decision-maker to estimate the unobservable private signals of the bidders and to determine the best reserve prices the end user can employ to sell a given set of items, or to purchase a given set of items, by conducting an auction.

In an embodiment, a method for determining a reserve price for a market, the method comprising the steps of: selecting characteristics of the market; selecting a relevant bidding model; estimating a structure of the market; predicting a bidding behavior; predicting a first outcome of the market; and evaluating the first outcome of the market. In an embodiment, the selecting characteristics step further comprises the steps of: receiving a first user input, wherein the first user input comprises information identifying an item to be auctioned; accessing a database; retrieving from the database historical bids data; retrieving from the database auction characteristics data, wherein the auction characteristics comprise information relating to historical auctions of similar items; outputting the bids data; and outputting the auction characteristics data. In an embodiment, the selecting a relevant bidding model step further comprises the steps of: receiving the auction characteristics data; accessing a database; retrieving from the database a relevant bidding model, wherein the bidding model is selected based on a corresponding relevance of the auction characteristics data; and outputting the relevant bidding model. In an embodiment, the estimating step further comprises the steps of: receiving the relevant bidding model; receiving bids data; expressing unobservable variables in terms of observable bids, wherein the unobservable variables are expressed in terms of observable bids by inverting the bid model; transforming the bids data to a sample of inverted bids, wherein the bids data are transformed by inverting the bid model; estimating an estimated latent structure of the market, wherein the sample of inverted bids receives application of statistical density estimation techniques to obtain the estimated structure; and outputting the estimated structure. In an embodiment, the bidding model has embedded an unknown structure, and wherein the predicting a bidding behavior step further comprises the steps of: receiving the estimated structure; receiving the relevant bidding model; substituting the estimated structure for the unknown structure; and outputting a prediction of bidding behavior. In an embodiment, the predicting a first outcome step further comprises the steps of: receiving a second user input, wherein the second user input comprises: an evaluation criterion, a candidate reserve price, and a constraint; receiving the estimated structure; receiving the bidding behavior prediction for the candidate reserve price, wherein the bidding behavior prediction further comprises a prediction under the constraint; obtaining a value of the evaluation criterion, wherein the value is based on the estimated structure, the bidding behavior prediction, the candidate reserve price, and the constraint, the value comprising the first predicted outcome; and outputting the value. In an embodiment, the evaluating the first outcome step further comprises the steps of: receiving a third user input, wherein the third user input comprises a plurality of candidate reserve prices; receiving a predicted outcome for each the candidate reserve price; calculating descriptive statistics for each the candidate reserve price, wherein the descriptive statistics comprise a mean and a variance; ranking each the candidate reserve price with respect to the calculated mean and generating corresponding rankings for the plurality; and outputting the descriptive statistics and the rankings. In an embodiment, the evaluating the first outcome step further comprises the steps of: selecting a best reserve price, wherein the best reserve price comprises the candidate reserve price within the plurality having the highest the ranking; and outputting the best reserve price.

In an embodiment, a computer system comprising: a bus; a memory interconnected with the bus; and a processor interconnected with the bus, wherein the processor executes a method for determining a reserve price for a market, the method comprising the steps of: selecting characteristics of the market; selecting a relevant bidding model; estimating a structure of the market; predicting a bidding behavior; predicting a first outcome of the market; and evaluating the first outcome of the market.

In an embodiment, a computer readable medium for causing a computer system to execute the steps in a method for determining a reserve price for a market, the method comprising the steps of: selecting characteristics of the market; selecting a relevant bidding model; estimating a structure of the market; predicting a bidding behavior; predicting a first outcome of the market; and evaluating the first outcome of the market.

Other features of the invention will become apparent to those of ordinary skill in the art from the following detailed description, taken in conjunction with the accompanying drawings, illustrating by way of example the principles of the invention.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 12 depicts a screen shot of a graphical user interface for inputting auction rules and parameters, in accordance with one embodiment of the present invention.

FIG. 13 is an exemplary tabular reserve price report, in accordance with one embodiment of the present invention.

DETAILED DESCRIPTION OF THE INVENTION

Figure 1:
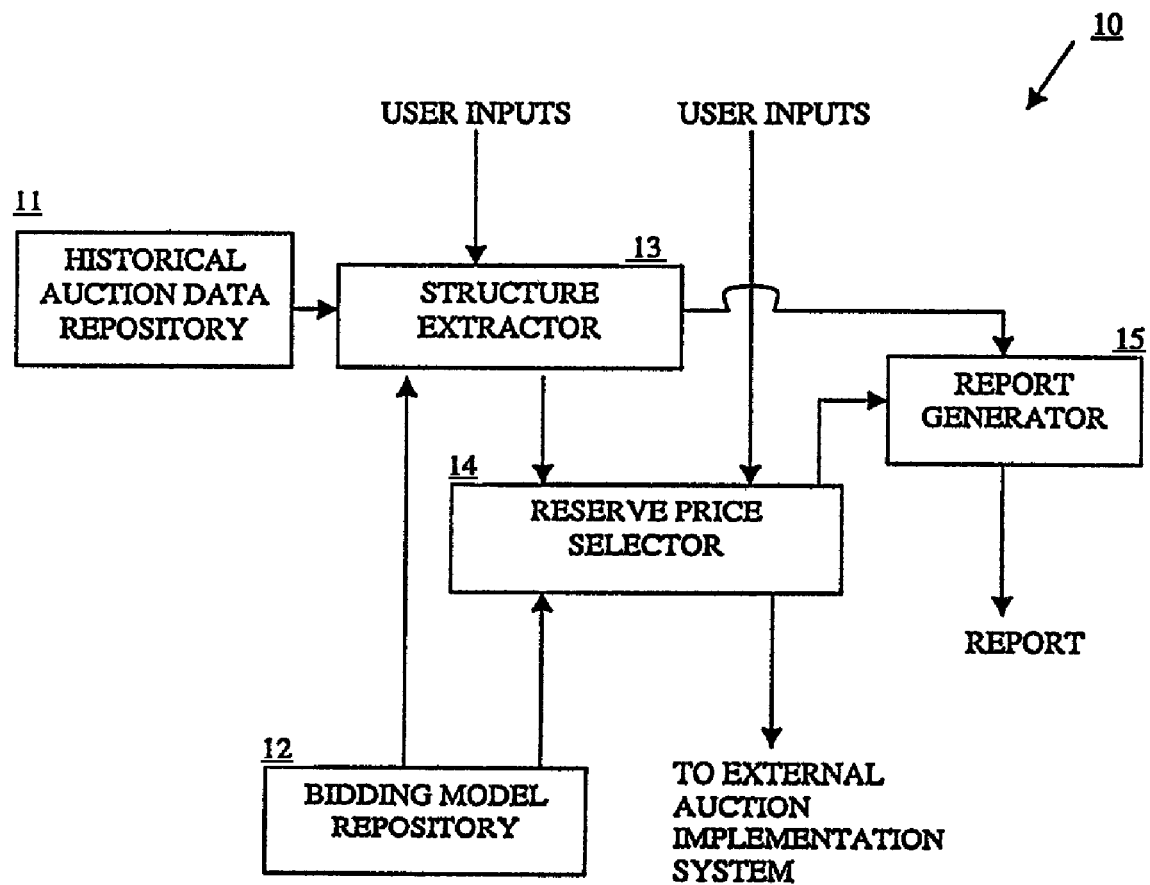
FIG. 1 schematically shows an automated decision support system for selecting reserve price in accordance with one embodiment of the invention.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail so as not to obscure aspects of the present invention.

Notation and Nomenclature

Some portions of the detailed descriptions, which follow, are presented in terms of procedures, steps, logic blocks, and other symbolic representations of operations on data bits that can be performed by computer systems. These descriptions and representations are used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical, electronic, magnetic, optical, and/or electro-optical signals capable of being stored, transferred, combined, compared, and otherwise manipulated in a computer system. It has proven convenient to refer to these signals as bits, values, symbols, characters, terms, numbers, or the like.

It should be born in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "obtaining" or "predicting" or "determining" or "accessing" or "designating" or "entering" or "estimating" or "finding" or "generating" or "modeling" or "calculating" or "inputting" or "selecting" or "simulating" or the like, refer to the action and processes of a computer system, or similar electronic computing device, that manipulates and transforms data represented as physical (electronic) quantities within the communications and computer systems' registers and memories into other data similarly represented as physical quantities within the computer system memories and registers or other such information storage, transmission, or display devices.

Certain portions of the detailed descriptions of the invention, which follow, are presented in terms of processes (e.g., process 1300, FIG. 13). These processes are, in one embodiment, carried out by processors and electrical and electronic components under the control of computer readable and computer executable instructions. These instructions reside, for example, in registers and other features of processors, memories, and data storage features of computers executing programs and processes. However, the computer readable and computer executable instructions may reside in any type of computer readable medium. Although specific steps are disclosed in figures herein describing the operations of processes (e.g., FIG. 13 describing process 1300), such steps are exemplary. That is, the present invention is well suited to performing various steps recited in the flowcharts of the figures herein. Further, it is appreciated that software or hardware or any combination of software and hardware may perform the steps of these processes.

The present invention is discussed primarily in the context of a method for calculating an optimal reserve price for an auction for the sale of an item where optimality may be with respect to any criterion selected by the end user from a multiplicity of possible evaluation criteria.

The present invention is envisioned as a decision support system for two kinds of end-users. The end-user of the system can be a seller who wishes to sell an item or a set of items by conducting an auction and wants to know the best reserve price to be used in the auctions to be conducted. Alternatively, the end-user can be a buyer who wishes to purchase an item or a set of items and wants to set the reserve prices for the said items in order to achieve the best outcome. In the following, the principles of the present invention are illustrated by using examples and descriptions for the sale of an item or a set of items. However, the appropriate modifications in the descriptions to address the decision problem from the point of a buyer who conducts auctions to purchase an item or a set of items should be obvious to those skilled in the art.

Exemplary Automated Decision System

FIG. 1 presents an automated decision support system 10 for selecting the optimal reserve price in accordance with one embodiment of the present invention. In one embodiment, the automated decision support system 10 is a software system implemented in a computer system. Alternative embodiments of the automated system 10 include implementation by hardware or firmware.

The computer system that embodies proposed decision support system 10 can be any kind of computer system. The computer can be a mainframe computer system, a server computer system, or a personal computer system.

In one embodiment of the present invention, the automated decision support system 10 analyzes available data using structural econometric techniques to estimate the unknown distribution of private information held by bidders. In addition, the automated decision support system 10 provides the optimal reserve price based on an evaluation criterion specified by the user of the system.

As can be seen from FIG. 1, the automated decision support system 10 includes a historical auction data repository 11, a bidding model repository 12, a structure extractor 13, and a reserve price selector 14.

The available data to the automated decision support system 10 include data supplied by the user of the system 10. The data include description of the item to be auctioned, candidate decisions and constraints, and an evaluation criterion. These are user inputs to the automatic decision support system 10. The system 10 receives the user inputs of the description of the item to be auctioned, candidate decisions and constraints, and an evaluation criterion. The system 10 then selects the best candidate decision based on the inputted evaluation criterion and estimated bidding behavior.

User input to the automated decision support system 10 include:

a set of item(s) to be auctioned (Example: {A Brand New 19 inch Ultra VGA HP Monitor, A Refurbished HP Kayak Desktop Computer with Intel Pentium III 850 Mhz, 128M RAM, 40 G hard disk}.)

a set of valuations, one for each of the item(s) in a above representing the dollar value the seller gets if the item is not sold in this auction. (Example: {$200 for the monitor, $800 for the computer})

a set of constraints on the auction parameters other than the reserve price (Examples: {Auction_Format=English} or {Auction_Format=Dutch OR English})

a set of candidate decisions, i.e., alternative reserve price levels, to be evaluated (Example: Reserve Price in range ($100, $400))

an evaluation criterion for ranking alternative decisions (Example 1: Expected profit of the seller. Example 2: A weighted average of expected profit of the seller and expected profits of the bidders. Example 3: Expected value of any function of the realized profit of the seller).

Exemplary User Interface

In FIG. 12 a screen shot of an exemplary graphical user interface is depicted as it appears on a computer's display device The available data also include historical auction data and bidding model data. The historical auction data and bidding model data are stored in the automated decision support system 10. The proposed system 10 maintains two data repositories: a historical auction data repository 11 for a multiplicity of goods and services; and a bidding model repository 12 that contains bidding models for a multiplicity of auction mechanisms and a multiplicity of market environments.

Historical auction data repository 11 contains data on past auctions. Historical auction data repository 11 can be implemented using any known database technology. For the purposes of illustrating the principles of the present invention, each record in the database is assumed to contain the variables listed in Table A below.

TABLE A

Auction:
    Auction ID
Auctioned Item:
    Item ID
    Name
    Quantity
    Description
Mechanism:
    Auction Format
    Reserve price
Bidders:
    Bidder ID
    Other bidder characteristics
Bids:
    Identities of participating bidders
    Bids submitted by participating bidders
Outcomes:
    Assigned payments for each bidder
    Assigned quantities for each bidder The bidding model repository 12 stores a variety of bidding models. The bidding model repository 12 can also be implemented using any known database technology.

A bidding model specifies bidding behavior as a function of information held by a bidder and the characteristics of the market structure. The market structure can be decomposed into two parts: characteristics of the auction mechanism and characteristics of the environment. These terms are explained in detail below.

Part of the information held by a bidder is inherently private, that is, is known only by the bidder himself/herself and not observed by other participants. For example, a bidder's willingness to pay for the auctioned item is known only by the bidder himself/herself. Another example of private information is that, in a procurement auction for a project, each bidder typically has private information about the cost he/she would incur to deliver the project if he/she wins the auction. From the point of view of other participants, the private information of bidder i, say, is a random variable with some probability distribution.

By a market structure we mean a collection of variables that describe the factors that may affect the bidding behavior of bidders. A market structure is characterized by two sets of variables: The first set of variables collectively describes the auction "environment," and the second set of variables collectively describes the auction "mechanism."

The first set of variables provides a description of the auction "environment." These variables include the number and other characteristics of bidders, the number and other characteristics of the auctioned item(s). For the purposes of illustrating the principles of this invention, we will take the number of items auctioned to be one.

In an auction with n bidders let $V_i$ denote the private signal of bidder i where i=1, . . . , n. This private signal is typically interpreted as bidder i's willingness to pay for the item, or his valuation of the item. Let $F(V_1, \ldots, V_n)$ denote joint distribution of bidders' private signals. A bidder's attitude towards risk is captured by the form of the function that describes his utility of wealth. If a bidder has private signal V and he wins the item with a price B, his utility is denoted by U(V−B). If the function U() is linear in its argument, then the person is risk-neutral. A concave utility function indicates risk-aversion. The degree of aversion to risk is measured by the degree of concavity of the function U(). In economics literature two common measures of risk aversion are used. The first one is the coefficient of relative risk aversion which is measured by $-xU''(x)/U'(x)$ where U' and U'' are the first and second derivatives, respectively, of the function U(), and x is the wealth level. The second measure is the coefficient of absolute risk aversion which is measured by $-U''(x)/U'(x)$.

For the purposes of illustrating the principles of this invention, the auction "environment" can be denoted by a list like [n, U(), $F(V_1, \ldots, V_n)$] which describes the number of bidders, the utility function of a typical bidder, and the joint distribution bidders' private signals. The key challenge faced by the end-user of the system is that at least some elements of the market structure that describe the auction environment, namely, the distributions of bidders valuations are unobservable (or latent) and have to be estimated from observable bid data on past auctions of similar items. Again, for the purposes of illustrating the principles of this invention, we take the number of bidders n to be observable and let the risk attitudes and the distribution of private signals be unobservable. We call the unobserved elements of the environment the latent structure.

The second set of variables collectively provides a description of the characteristics of the auction mechanism in use. These variables include auction format (which may be English, Dutch, Vickrey, Sealed-Bid First-Price, etc.), reserve price (the lowest acceptable bid in an auction for selling an item; the highest acceptable bid in an auction for procuring an item), starting price, entry rule, bid increment rule, closing rule etc. As is well known, holding everything else fixed, any variation in any of the dimensions of the auction mechanism can, in principle, result in variations in the submitted bids. For the purposes of illustrating the principles of this invention, mechanism characteristics can be represented by a list.

Example 1: The list (Format=Dutch, Reserve Price=$100 per item Entry Rule={By Invitation, Free}, Start Price=$500, Bid Increment=-$1/second, Closing Rule=n/a) describes a Dutch auction in which the bidders are the ones invited to participate in the auction, the price starts at $500 and is reduced at a rate of $1 per second until a bidder claims the item at the current price. If the price reaches $100 without any bidder claiming the item, the auction ends with no sale.

Example 2: The list (Format=Vickrey, Reserve Price=0, Entry Rule={By Invitation, Free}, Start Price=n/a, Bid Increment=n/a, Closing Rule=n/a) describes a standard Vickrey auction with a reserve price of 0. A Vickrey auction is a sealed bid auction in which the highest bidder wins the auctioned item, and pays the second highest bid or the reserve price whichever is higher.

Example 3: The list (Format=Sealed Bid First Price, Reserve Price=$150 per item, Start Price=n/a, Entry Rule={Open, Fee=$5}, Closing Rule=n/a) describes a standard sealed-bid first-price auction in which anyone who pays $5 entry fee (and otherwise qualifies) can submit a bid, which is required to be no less than $150, anytime during a specific time period. At the end of the specified period, the bidder who submitted the highest bid wins the item and pays what he bid. In this example all bidders are treated symmetrically.

A bidding model for an n bidder auction with a given mechanism characteristics and a given environment specifies n bid functions, $(\beta_1, \beta_2, \ldots, \beta_n)$, one for each bidder. A bidder's bid function is a relation between the private signal of the bidder and the bid he/she submits. Some examples are as follows.

Let V denote a dummy variable indicating the private valuation of a bidder, and $\beta_j$ (V, mechanism characteristics, environment) denote the bid function of bidder j.

Example 1: A bidding model for Vickrey auction for the sale of an item $\beta_j$(V, {Format=Vickrey, Reserve Price=R}, [n, U( ), $F(V_1, \ldots, V_n)$])=V for all bidders j. That is, regardless of the environment, each bidder submits a bid equal to his private valuation.

Example 2: A bidding model for sealed-bid first-price auction for the sale of an item with risk-neutral bidders:

$\beta_j$(V, {Format=Sealed Bid First Price, Reserve Price=R}, [n, $F(V_1, \ldots, V_n)$])=V$-\int_r^V L(a|V)da$, where L(a|V) is further expressed in terms of the joint distribution $F(V_1, \ldots, V_n)$. This expression is first described by P. Milgrom and R. Weber in 1982 in an article entitled "A Theory of Auctions and Competitive Bidding," published in *Econometrica*.

Example 3: A bidding model for Dutch auction is the same as the bidding model in Example 2 above.

The structure extractor 13 is used to estimate the unknown elements of the market structure. The structure extractor 13 first receives the user input of the item (and its characteristics) to be auctioned. The structure extractor 13 then accesses the repository 11 for the bid data and auction characteristics data observed in previous auctions of similar items. The structure extractor 13 is connected to historical auction data repository 11 and the bidding model repository 12. The structure extractor 13 then produces non-parametric estimates of the unknown structural elements of the auction environment. The structure extractor 13 uses auction theory and non-parametric statistical methods to extract an estimate of the latent structure from the previously observed bids. The structure and operation of the structure extractor 13 will be described in more detail below, also in conjunction with FIGS. 2 and 4-6.

Figure 2:
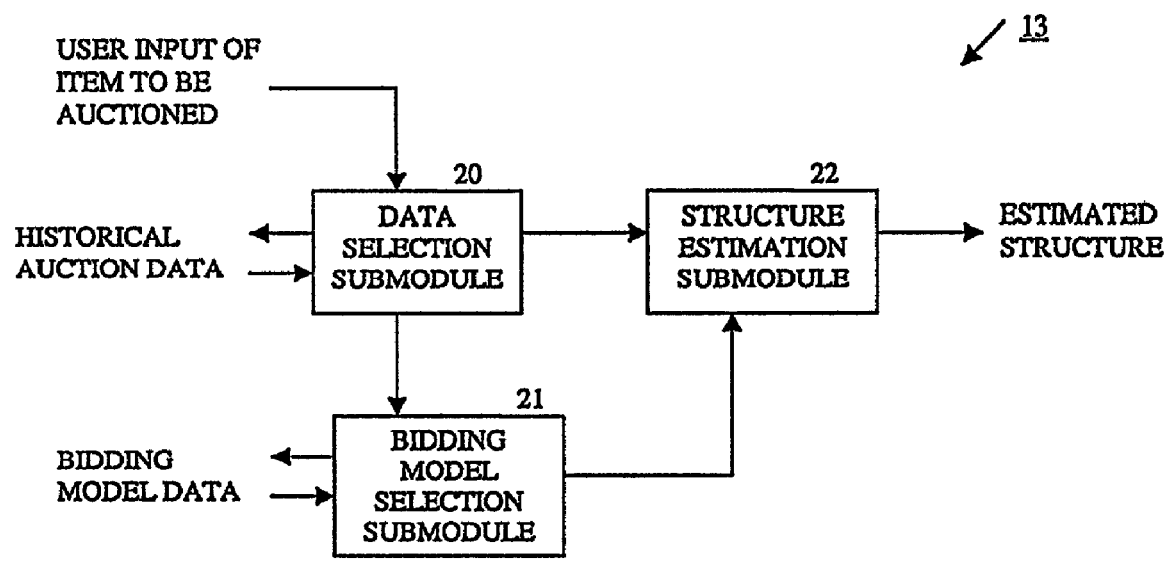
FIG. 2 shows in block diagram form the configuration of the structure extractor of the decision support system of FIG. 1.

Referring to FIG. 2, the structure extractor 13 includes a data selection submodule 20, a bidding model selection submodule 21, and a structure estimation submodule 22. The data selection submodule 20 includes a user interface (not shown, any user interface technology suffices) that allows the data selection submodule 20 to receive user input of the item to be auctioned. The user input also includes the characteristics data of the item to be auctioned. This allows the data selection submodule 20 to obtain from the repository 11 (FIG. 1) the auction characteristics data and the bid data of the previously observed auctions of items similar to the item to be auctioned.

Figure 4:
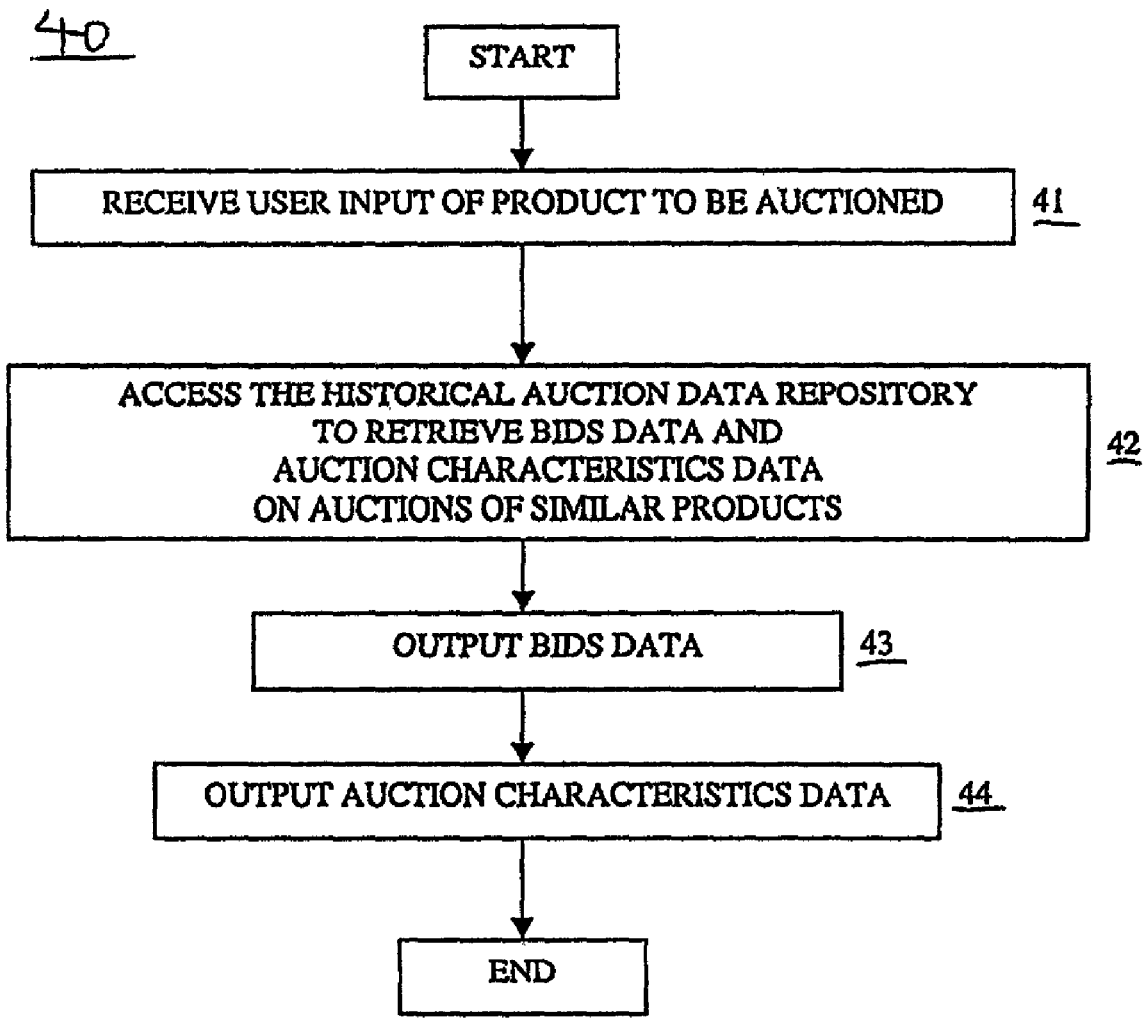
FIG. 4 is a flow chart diagram showing the process of the data selection submodule of the structure extractor of FIG. 2.

The data selection submodule 20 then accesses the repository 11 (FIG. 1) for the bid data and auction characteristics data of the previously observed auctions of the same or similar items. FIG. 4 shows the operation of the data selection submodule 20, which will be described in more detail below.

Figure 5:
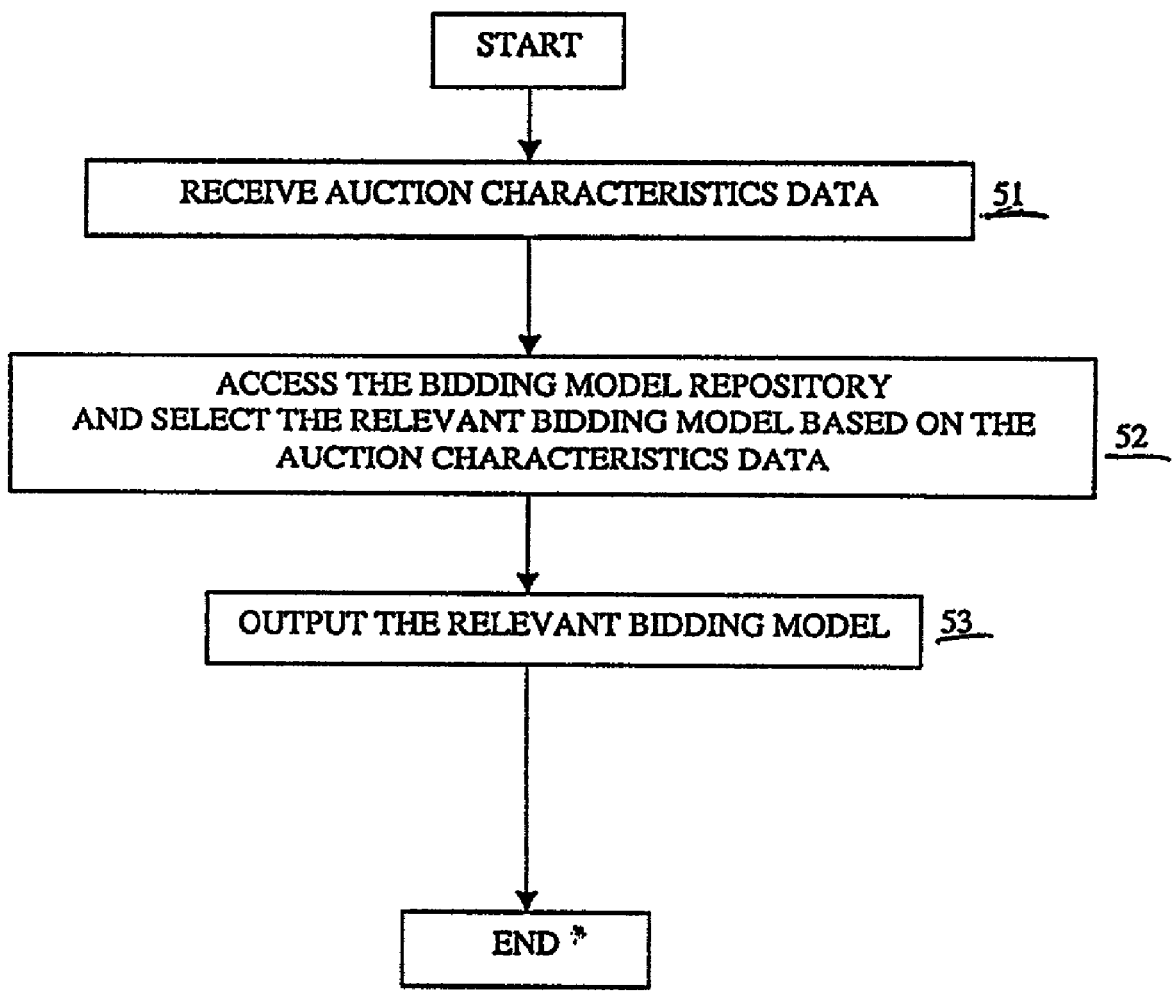
FIG. 5 is a flow chart diagram showing the process of the bidding model selection submodule of the structure extractor of FIG. 2.

The bidding model selection submodule 21 uses the auction characteristics data to access the repository 12 to select the appropriate or relevant bidding model or models. This means that the bidding model selection submodule 21 will select any bidding model(s) matching the auction characteristics data. FIG. 5 shows the operation of the bidding model selection submodule 21, which will be described in more detail below.

Figure 6:
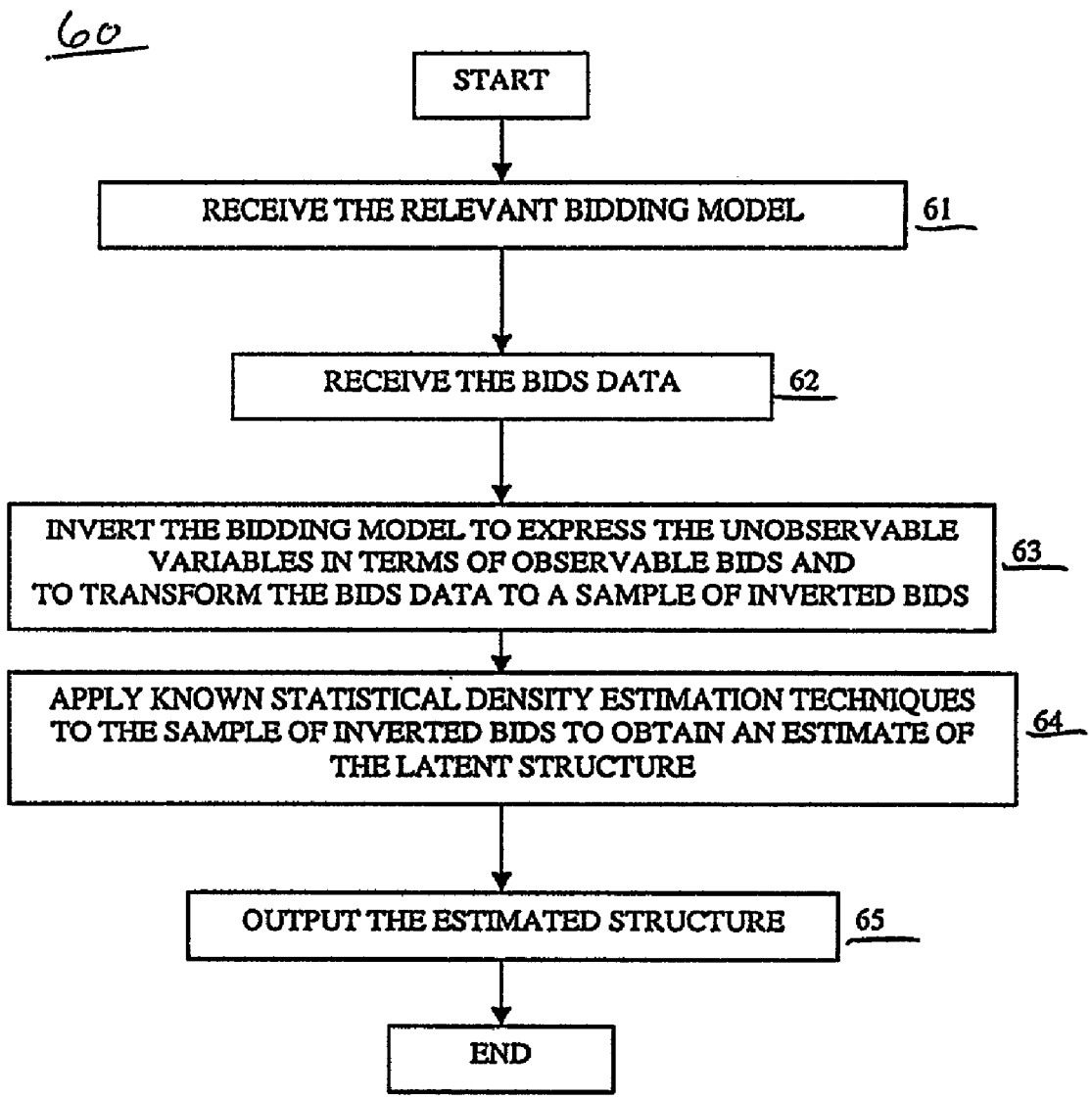
FIG. 6 is a flow chart diagram showing the process of the structure estimation submodule of the structure extractor of FIG. 2.

The structure estimation submodule 22 is the main submodule that provides the estimation using known structural econometric techniques and known statistical techniques as described above. The structure estimation submodule 22 receives the bid data from the data selection submodule 20 and the bidding model (or models) from the bidding model selection submodule 21. The structure estimation submodule 22 applies the bid data to the bidding model to invert the bidding model so as to express the unobservable or unknown variables in terms of observable bid data. Then the structure estimation submodule 22 applies known statistical density estimation techniques to the expression to obtain an estimate of the unknown structure. FIG. 6 shows the operation of the structure estimation submodule 22, which will be described in more detail below.

FIG. 4 shows in flow chart diagram form the process of the data selection submodule 20 of FIG. 2. The process starts at the step 40. At the step 41, the data selection submodule 20 receives the user input of the item to be auctioned. At the step 42, the data selection submodule 20 accesses the repository 11 (FIG. 1) to extract the bid data and auction characteristics data of previous auctions of the same or similar items. At the steps 43 and 44, the bid data and the auction characteristics data are sent out. The bid data are sent to the structure estimation submodule 22 and the auction characteristics data are sent to the bidding model selection submodule 21. The process ends at the step 45.

FIG. 5 shows in flow chart diagram form the process of the bidding model selection submodule 21 of FIG. 2. The process starts at the step 50. At the step 51, the bidding model selection submodule 21 receives the auction characteristics data from the data selection submodule 20 of FIG. 2. At the step 52, the bidding model selection submodule 21 selects the relevant bidding model from the repository 12 (FIG. 1) based on the auction characteristics data. This means that the bidding model selection submodule 21 selects a bidding model that matches the auction characteristics data from the repository 12. At the step 53, the bidding model is sent to the structure estimation submodule 22 (FIG. 2).

FIG. 6 shows in flow chart diagram form the process of the structure estimation submodule 22 of FIG. 2. The process starts at the step 60. At the step 61-62, the structure estimation submodule 22 receives the relevant biding model and the bid data. At the step 63, the structure estimation submodule 22 applies the bidding model to the bid data to invert the bidding model so as to express the unobservable or unknown variables in terms of observable bid data. At the step 64, the structure estimation submodule 22 applies known statistical density estimation techniques to the expression so as to obtain an estimate of the structure. At the step 75, the estimated structure is outputted.

As an example, suppose that historical auction data repository contains data on past auctions of the specified item. Suppose that some of these auctions are run under English format, and some are run under a sealed-bid first-price format. In this example, the bidding model selection submodule 21 retrieves two bidding models and passes these models to the structure estimation submodule 22. These bidding models are MODEL 1: $\beta_j(V, \{Format=English, Reserve Price=0\}, [n, U(\ ), F(V_1, \ldots, V_n)])=V$ for all bidders j and MODEL 2: $\beta_j(V, \{Format=Sealed Bid First Price, Reserve Price=0\}, [n, U(\ ), F(V_1, \ldots, V_n)])=\psi(V)$ where $\psi(V)$ is a function that depends on $U()$ and $F()$.

Structure estimation submodule 22 estimates the unknown functions $U()$ and $F()$ using a method described by Guler, Liu and Tang (2001) in "Joint Estimation of Bidder Risk Attitudes and Value Distributions."

The structure estimation submodule 22 outputs the estimated structure $(U\hat{}(), F\hat{}())$ to the reserve price selector module 14 of FIG. 1, and to the report generator module 15 of FIG. 1.

Figure 3:
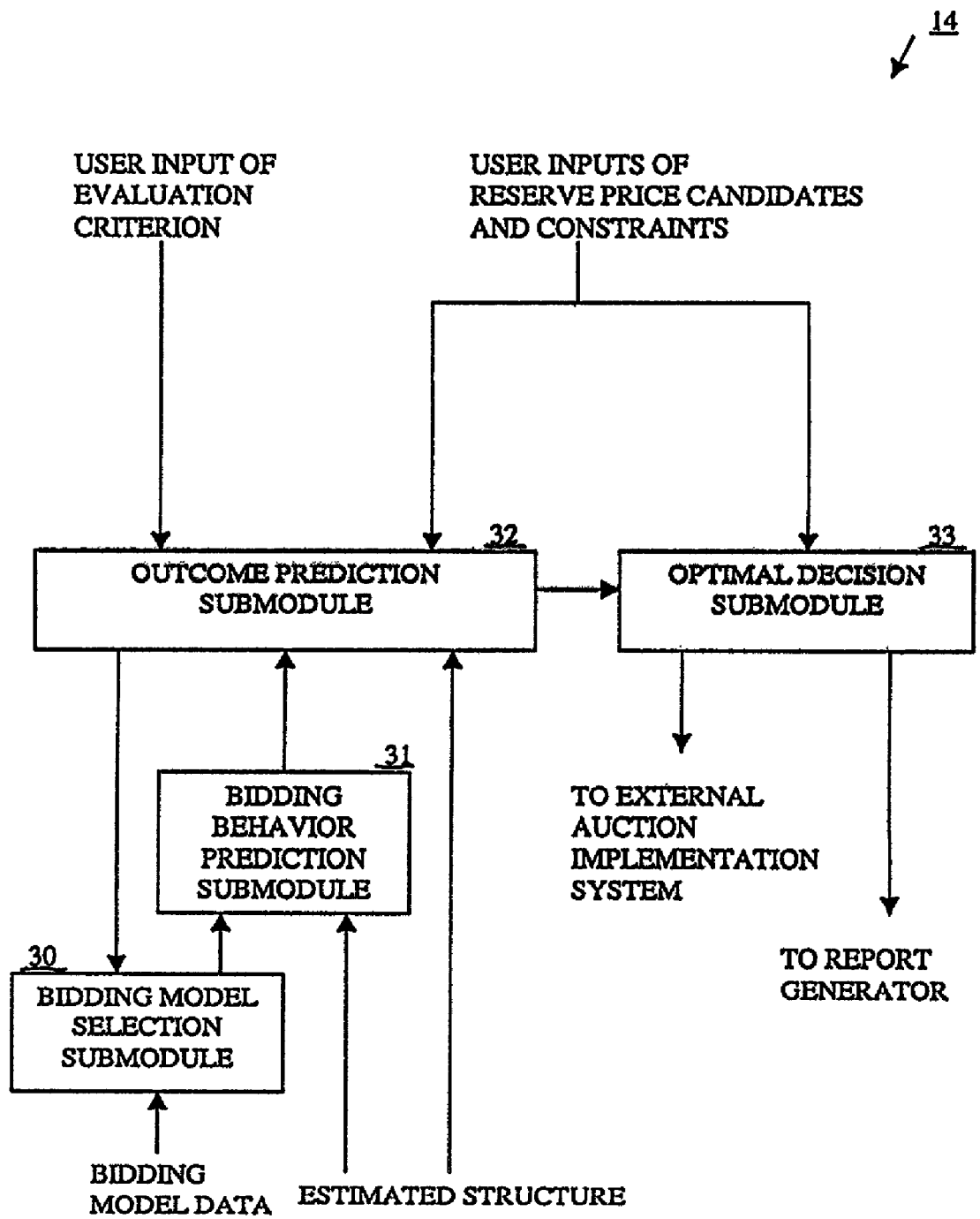
FIG. 3 shows in block diagram form the structure of the reserve price selector of the decision support system of FIG. 1.

FIG. 3 depicts the structure of the reserve price selector module 14 of FIG. 1. The reserve price selector module 14 has four submodules: the bidding model selection submodule 30, the bidding behavior prediction submodule 31, the outcome prediction submodule 32, and the optimal decision submodule 33.

The process of the bidding model selection submodule 30 is depicted in FIG. 5 in flow chart diagram form. The process starts at the step 50. At the step 51, the bidding model selection submodule 21 receives the auction characteristics data from the outcome prediction submodule 32 of FIG. 3. At the step 52, the bidding model selection submodule 30 selects the relevant bidding model from the repository 12 (FIG. 1) based on the auction characteristics data. This means that the bidding model selection submodule 30 selects a bidding model that matches the auction characteristics data from the repository 12. At the step 53, the bidding model is sent to the bidding behavior prediction submodule 31 (FIG. 3).

Figure 7:
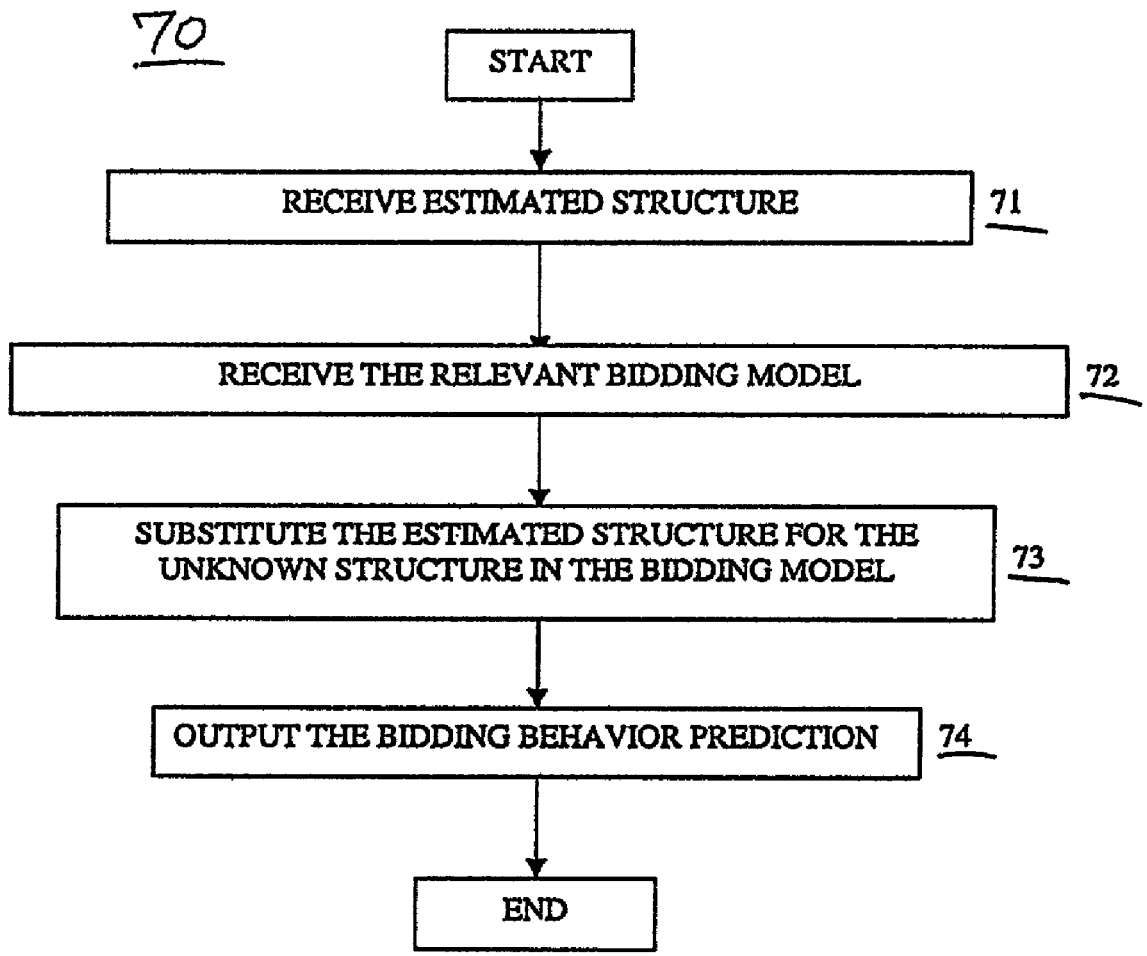
FIG. 7 is a flow chart diagram showing the process of the bidding behavior prediction submodule of the reserve price selector of FIG. 3.

FIG. 7 depicts the process of the biding behavior prediction submodule 31 in flow chart diagram form. The process starts at the step 70. At the step 71, estimated structure is received from the structure extractor module 13 of FIG. 1. At the step 72, the bidding behavior prediction submodule 31 receives the relevant bidding model from the bidding model selection submodule 30. Predicted bidding behavior is obtained by substituting the estimated structure for the unknown elements in the retrieved bidding model. The bidding behavior prediction submodule 31 outputs the predicted bidding behavior to the outcome prediction submodule 32.

The outcome prediction submodule 32 receives user inputs of (1) the seller's valuation of the item, $V_S$, representing the value the seller gets if the item is not sold in this auction, (2) a set of constraints on the auction parameters, (3) a set of candidate reserve prices to be evaluated, and (4) a criterion for evaluating alternative reserve price levels. It also receives the estimated structure $(U\hat{}(), F\hat{}())$ from the structure extractor module 13 of FIG. 1. It then passes each of the candidate reserve price levels together with the other auction parameters to the bidding model selection submodule 30 and receives predicted bidding behavior from the bidding behavior prediction submodule 31 for each of the candidate reserve price levels. The outcome prediction submodule 32 then calculates the distribution of the value of the evaluation criterion for each of the alternative reserve price levels by substituting the predicted bidder behavior and the estimated structural elements.

Figure 8:
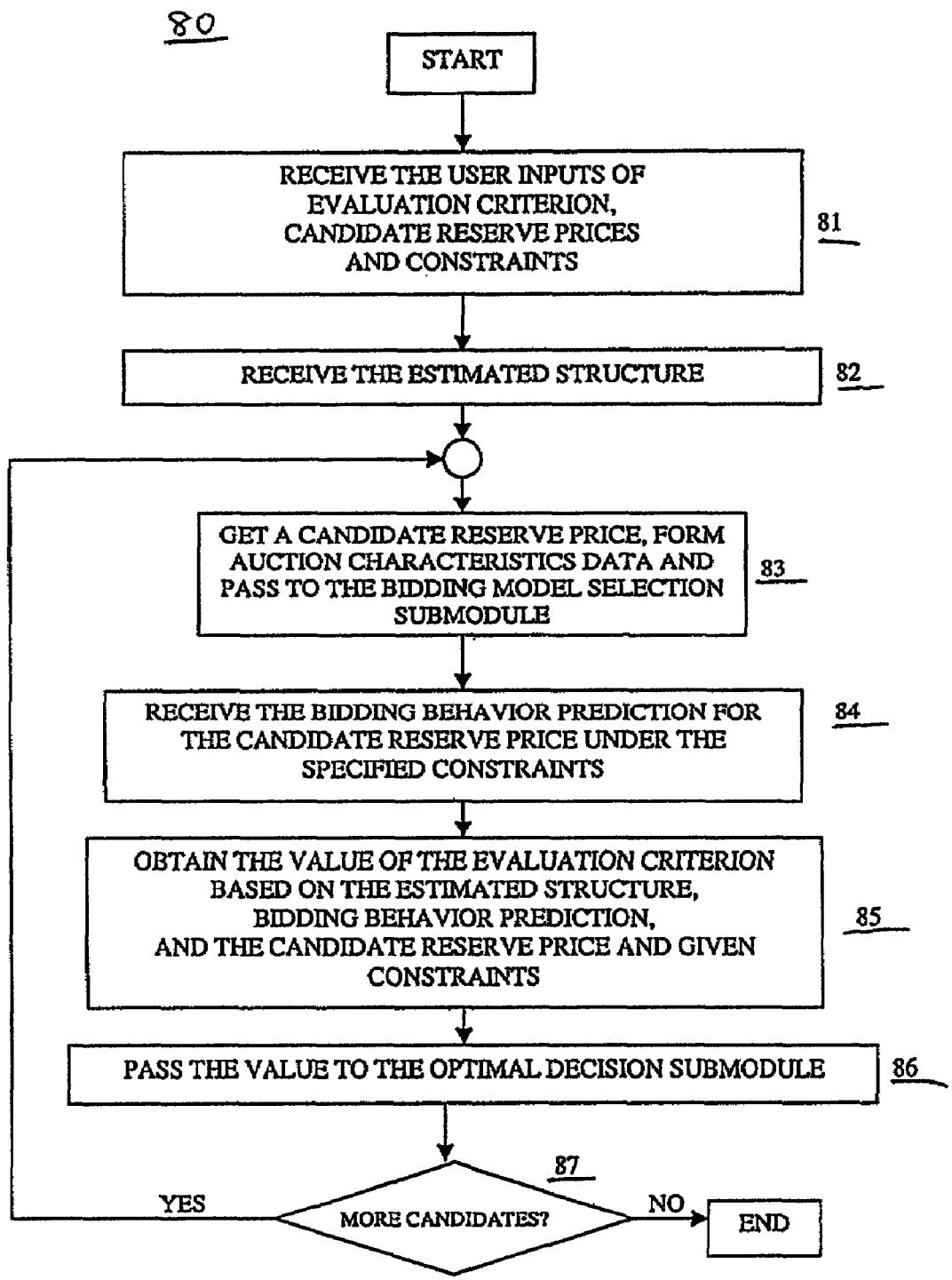
FIG. 8 is a flow chart diagram showing the process of the outcome prediction submodule of the reserve price selector of FIG. 3.

FIG. 8 depicts in flow chart diagram form the process of the outcome prediction submodule 32 of FIG. 3. The process starts at the step 80. At the step 81 the outcome prediction submodule 32 receives user inputs of evaluation criterion, candidate reserve prices and constraints on other auction parameters. At the step 82, the outcome prediction submodule 32 receives the estimated structure from the structure extractor module 13 of FIG. 1. At the step 83, the outcome prediction submodule 32 sends the auction characteristics data formed based on the user inputs of candidate reserve price levels and other auction parameters to the bidding model selection submodule 30. At the step 84, the outcome prediction submodule 32 receives the bidding behavior prediction for the candidate reserve price under the specified constraints. At the step 85, the outcome prediction submodule 32 obtains the distribution of the value of the evaluation criterion based on the estimated structure, biding behavior prediction and the candidate reserve price and given constraints. At the step 86, the predicted outcome is passed to the optimal decision submodule 33. The predicted outcome is a probability distribution for the value of the evaluation criterion. At the step 87, the outcome prediction submodule 32 checks if there are any more candidate decisions to be evaluated. If there are more candidate reserve price levels to be evaluated, the outcome prediction submodule 32 loops over the steps 83-87 until all candidate decisions are evaluated.

The optimal decision submodule 33 receives the predicted outcome from the outcome prediction submodule 32 and calculates the descriptive statistics (mean and variance) for the value of the evaluation criterion for each of the candidate reserve price levels.

Figure 9:
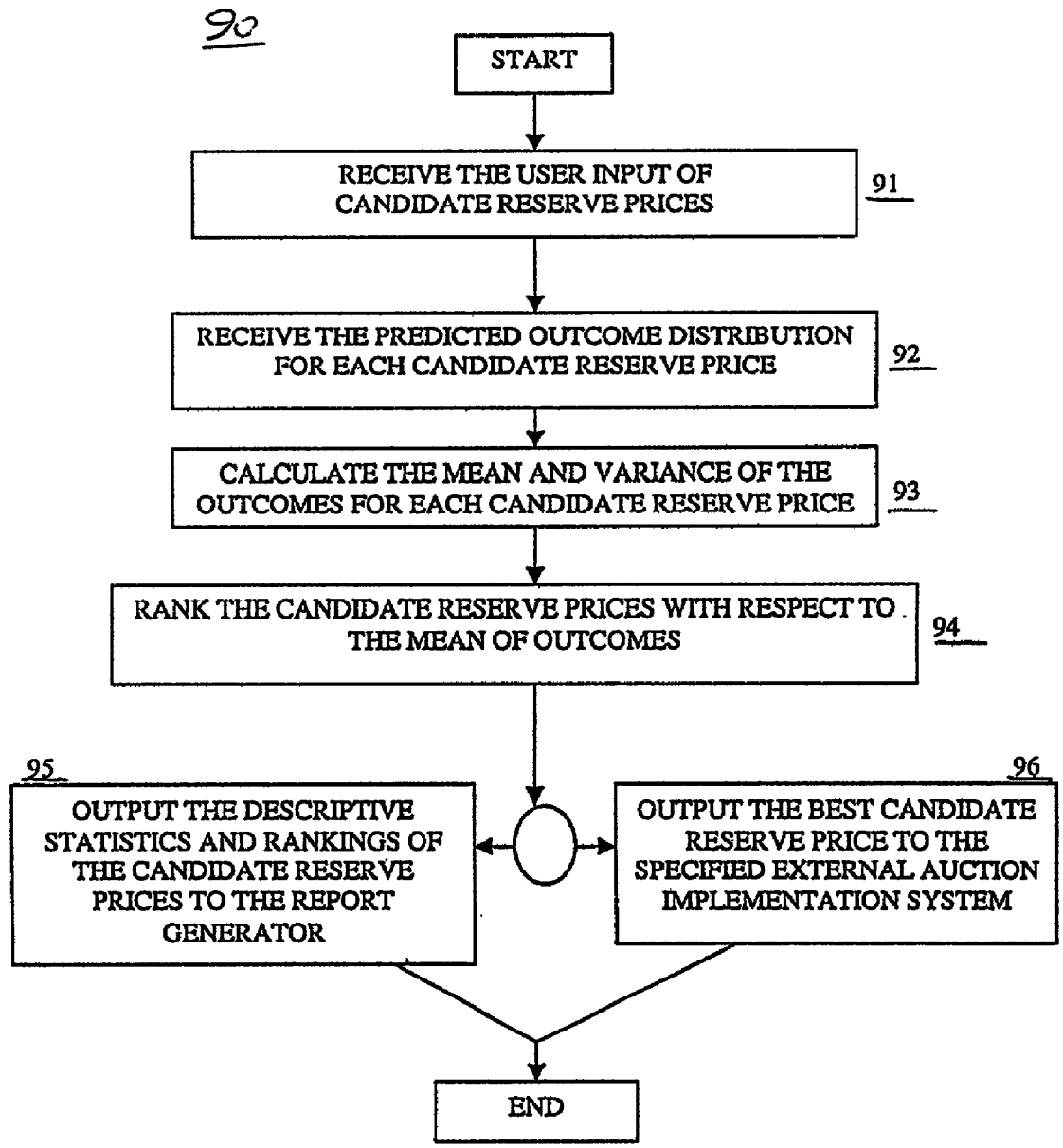
FIG. 9 is a flow chart diagram showing the process of the optimal decision submodule of the reserve price selector of FIG. 3.

FIG. 9 depicts the process of the optimal decision submodule 33 in flow chart diagram form. The process starts at the step 90. At the step 91, the optimal decision submodule 33 receives the user input of candidate reserve prices. At the step 92, the optimal decision submodule 33 receives the predicted outcome distribution for each of the candidate reserve price levels. At the step 93, the optimal decision submodule 33 calculates the mean and the standard deviation of the outcome for each of the candidate reserve price levels. In one embodiment of the present invention, the next step in process of the optimal decision submodule 33 is the step 95. At the step 95, the descriptive statistics of the outcome distribution for each candidate decision are outputted to the report generator module 15 of FIG. 1. In an alternative embodiment, the step 96 is executed. At the step 96, the best candidate reserve price is outputted to a user-specified external auction implementation system so that the specified item can be auctioned under the optimal reserve price.

The report generator module 15 of FIG. 1 receives the estimated structure from the structure extractor module 13 of FIG. 1. It also receives from the optimal decision submodule 33 of FIG. 3 the rankings and descriptive statistics of the predicted outcome for each of the alternative reserve price levels under consideration and presents this information in the form of a tabular and/or graphical report. FIG. 13 is an exemplary tabular reserve price report, in accordance with one embodiment of the present invention.

Figure 14:
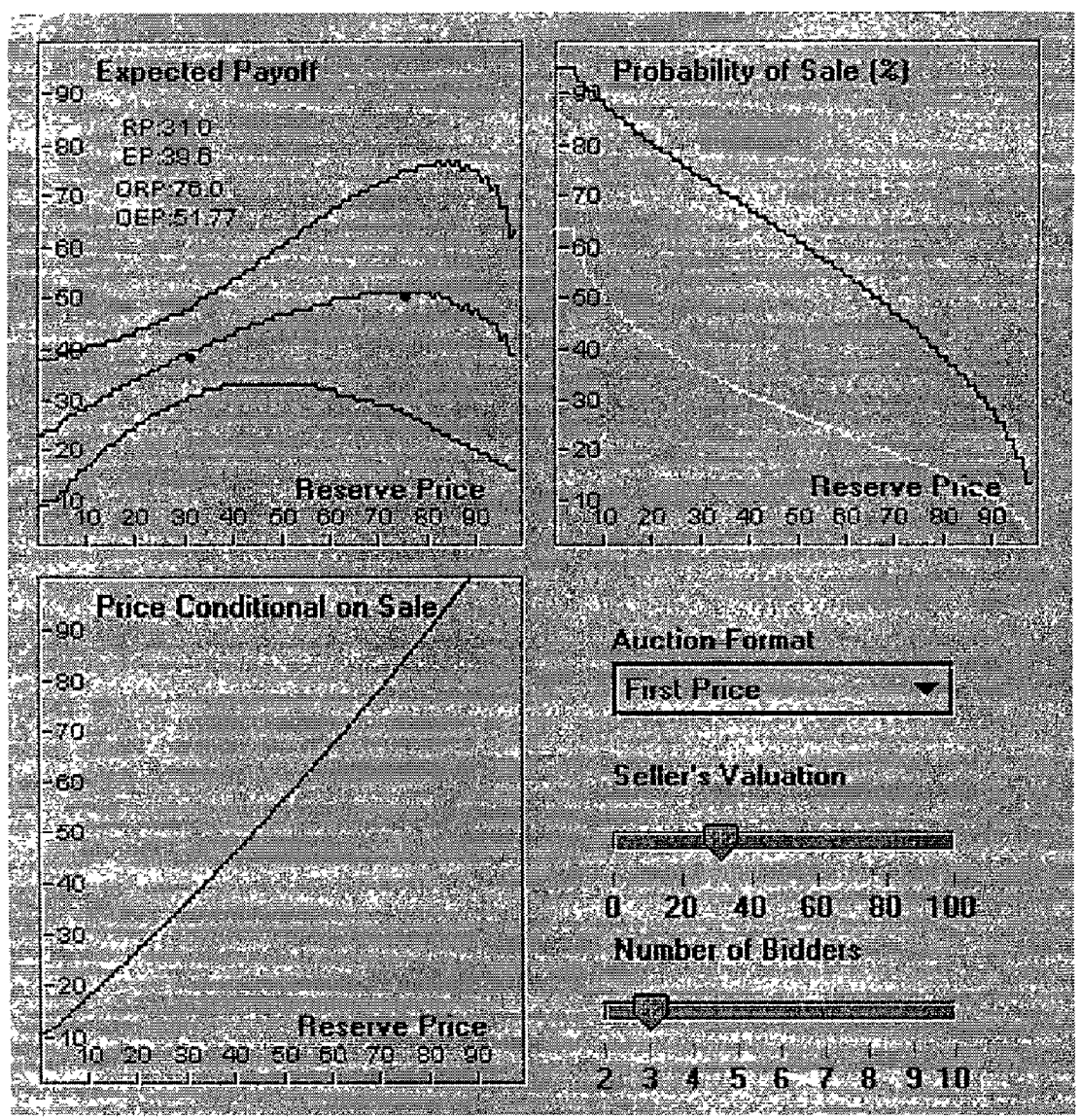
FIG. 14 is an exemplary graphical reserve price report, in accordance with one embodiment of the present invention.

FIG. 14 is an exemplary graphical reserve price report, in accordance with one embodiment of the present invention.

Exemplary System Platform

Exemplary Computer System

Figure 10:
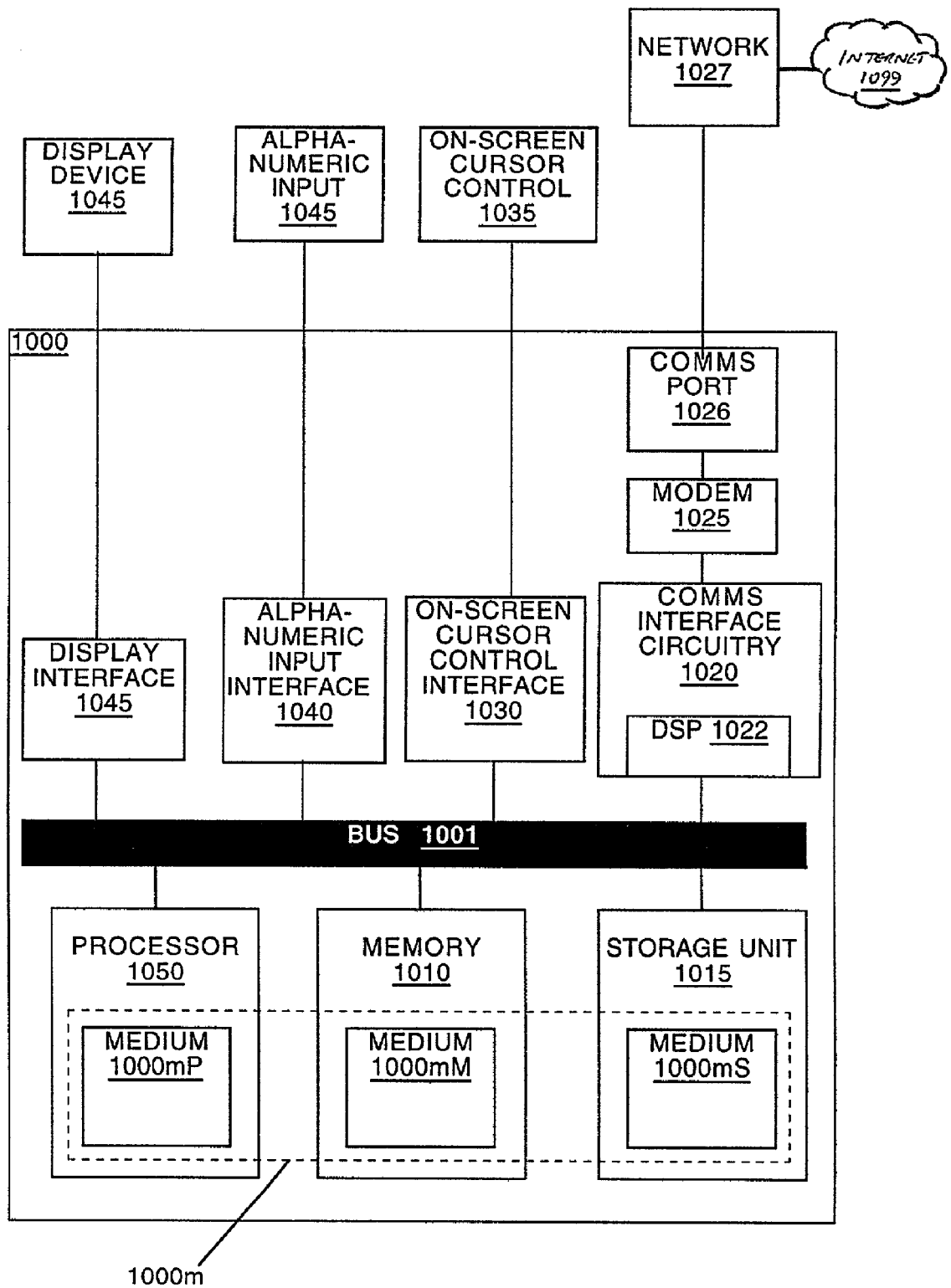
FIG. 10 is a schematic diagram depicting a computer system for implementing a process of automated setting of a reserve price for an auction, in accordance with one embodiment of the present invention.

FIG. 10 is a block diagram depicting, in accordance with one embodiment of the present invention, a computer system 1000 and computer usable medium 1000m. With reference to FIG. 10, computer system 1000 includes a bus 1001 for communicating information, a central processor 1050 coupled with the bus 1001 for processing information and instructions, and a memory unit 1010 (e.g., random access memory and/or read only memory) and a data storage system 1015 coupled with the bus 1001 for storing information and instructions. Data storage system 1015 may be any magnetic and/or optical disc and drive/reader, or any other data storage device.

In one embodiment of the present invention, the processes described may be executed by processor 1050, which may an application specific integrated circuit (ASIC). Alternatively, these methods may be implemented by processor 1050 executing a program stored in memory 1010 and/or data storage system 1015. It is appreciated that computer system 1000 may implement the invention by combinations of these schemes, or by alternatives other than those pictured. It is also appreciated that computer system 1000 can include other elements not shown. It is further appreciated that computer system 1000 may be constituted by any functional equivalent, or by any viable alternative architecture.

In the present embodiment, computer system 1000 includes a communications device 1025. Communications device 1025 may be a modulator/demodulator (MODEM). Communications device 1025 enables communication via a communications port 1026.

In the present embodiment, computer system 1000 may be communicatively coupled with an external network 1027, via communications port 1026. External network 1027 may be a local area network (LAN), or any other feasible network configuration, and may include other networks including wide area networks (WAN) and the Internet 1099.

Computer system 1000 executes, in one implementation, a program embodied in a computer readable medium 1000m which may be deployed in and/or to various degrees between processor 1050 (e.g., as 1000 mP), memory 1010 (e.g., as 1000 mM), and storage unit 1015 (e.g., as 1000 mS). In the present implementation, execution of this program by computer system 1000 enables a process, which implements a method for analyzing new auction rules, from limited and partially observable bidder characteristics and by utilizing any known results on some aspects of the new auction rules.

Figure 11:
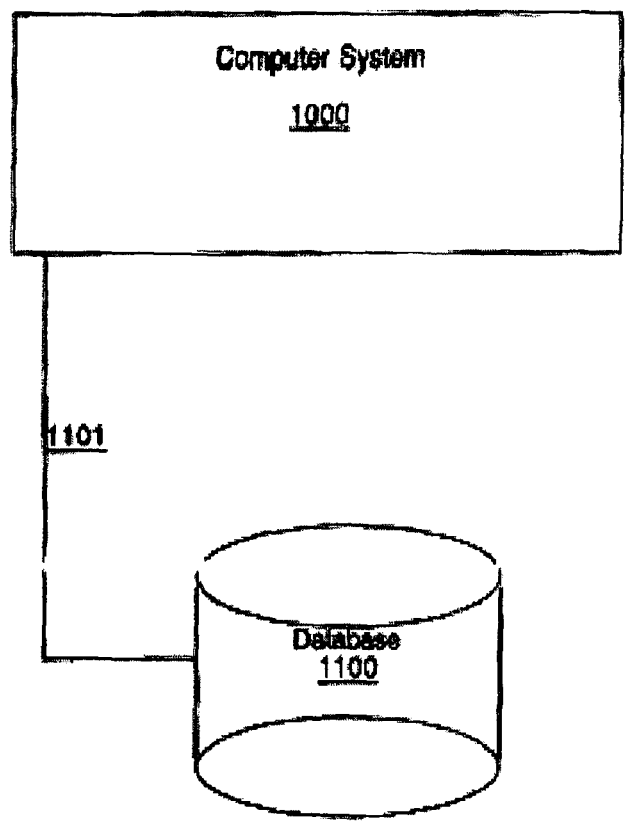
FIG. 11 is a diagram depicting a database of historical auction data, in accordance with one embodiment of the present invention.

In one embodiment, bidder characteristics, auction outcomes and formats, and accompanying rules may be archived in, written to, retrieved from, and modified within a database (e.g., repositories 11 and 12; FIGS. 1 and 11). In one embodiment, the database may be deployed within computer readable medium 1000m.

In the present embodiment, system 1000 also optionally contains a display interface 1045 coupled to the bus 1001 for enabling incorporation of a display device 1046. Display device 1046 enables displaying information to users. In one embodiment, display interface 1045 may be a graphical user interface (GUI). In one embodiment, display interface 105 enables an input interface. In one embodiment, aspects of display interface 1045 may be deployed within computer readable medium 1000m.

System 1000 may include an alphanumeric input interface 1040 coupled to the bus 1001 for enabling incorporation of an alphanumeric input device 1041. Alphanumeric input device 1041 can communicate information and command selections to processor 1050 via alphanumeric input interface 1040 and bus 1001.

System 1000 also includes an optional cursor control or directing device (on-screen cursor control 1036) coupled to bus 1001 via on-screen cursor control interface 1030, for communicating user input information and command selections to processor 1050. In one implementation, on-screen cursor control 1036 is a mouse, trackball, joystick or special keys on alphanumeric input device 1041 capable of signaling movement of a given direction or manner of displacement. Input interface 1040 and cursor control 1036 may both function, individually or in concert, as enabling mechanisms of user input.

In one embodiment, computer system 1000 may be a PC, a desktop, a laptop, or another implementation such as a mainframe or supercomputer. In another embodiment, computer system 1000 may be another computer platform, including, but not limited to PC type platforms, Macintosh, UNIX, servers, and workstations of various types. In yet another embodiment, computer system 1000 may be a portable computer platform, such as a PDA, palmtop computer, or the like. In another embodiment, system 1000 may be any other intelligent electronic system capable of implementing computer functions, such as cellular telephones, two-way pagers, other pagers, other data and communication systems, and other information processing platforms with auction capabilities.

Exemplary Database

The exemplary database 1100 herein contains information about past auctions and market participants. In one embodiment, database 1100 may be interconnected with computer system 1000 by an interconnecting functionality 1101, which may be any communicative coupling agent, wire-based or wireless. In another embodiment, database 1100 may be disposed as an integral part of computer system 1000, interconnected with other functionalities of computer system 1000 by a system bus (e.g., bus 1001; FIG. 10). In one embodiment, access between database 1100 and computer system 1000 may be effectuated via a network (e.g., network 1027; FIG. 11) and/or via the Internet (e.g., Internet 1099; FIG. 11).

In one embodiment of the present invention, the following variables are observed for each auction in the database, shown in FIG. 11, as listed in Table B, below. Auction data includes the-auction identification and other characteristics thereof. Information about the auctioned item includes its identity, its name, quantity, description, and other attributes. The market mechanism contains data about the auction format, reserve price and other mechanism attributes. Bidders are identified by bidder and segment identity and other attributes. Bids are categorized by the identities of participating bidders and the bids submitted by them. Outcomes listed include assigned payments and quantities for each bidder. These are detailed below in Table B.

Table B

HISTORICAL AUCTION DATA REPOSITORY

Historical Auction Data Repository contains data on past auctions. For the purposes of one embodiment of the present invention, we assume that the following variables are observed for each auction in the database.
    Auction:
    Auction ID
    Further Auction Characteristics
    Auctioned Item:
    Item ID
    Name
    Quantity
    Description
    Further Item Characteristics
    Mechanism:
    Auction Format
    Reserve Price
    Further Mechanism Characteristics
    Bidders:
    Bidder ID
    Segment ID
    Further Bidder Characteristics
    Bids:
    Identities of Participating
    Bids submitted by participating bidders
    Outcomes:
    Assigned payments for each bidder
    Assigned quantities for each bidder
    AUCTION CHARACTERISTICS:
    Auction ID
    Item ID
    Item Name
    Quantity
    Dates:
       Announcement
       Start
       Close
    Seller/Buyer ID
    Auction Mechanism Characteristics
    Invited Bidders' Ids
    Participating bidders' Ids and Bids, Quantities
    Outcome:
       Assigned Price for each bidder
       Assigned Quantities for Each Bidder
    Fees:
       Shipping & Handling
       Taxes
       Auctioneer Fees:
          Posting Fee
          Ad Valorem Fee
BIDS:
Bid ID
Auction ID
Item ID
Bidder ID
Bid Time Stamp
Price Bid
Bid Type
    Proxy
    Direct
Quantity Desired
Minimum Quantity
Currency
MECHANISM CHARACTERISTICS
Format
    English
    Dutch
    Sealed Bid First Price
    Sealed Bid Second Price
    Vickrey
    etc.
Buy/Sell
Entry Rule
    Open
       Free
       Fee
    Invitation
       Free
       Fee
Reserve Price
    Secret
    Open
Start Price
Bid Increment
    Fixed
    Relative
Closing Rule
    Inactivity Time
    Fixed Closing Time
ITEM CHARACTERISTICS
Item ID
Name
Description
Location
SKU
Manufacturer
Model Number
Condition
Warranty
Weight
Weight Unit
Measurement Unit
Currency
List Price
etc.

BIDDER CHARACTERISTICS
ID
Segment ID
Name
Address
General Information
Socio-Demographic Information
etc.
SELLER/BUYER CHARACTERISTICS
Seller/Buyer ID
Name
Address
General Information
Socio-Demographic Information
etc.

Exemplary process for Determining Optimal Reserve Price for Auction

Deciding on a reserve price choice requires anticipating a wide range of potential variation along several key dimensions. One embodiment of the present invention allows five dimensions in formulating a reserve price choice. In an alternative embodiment, other dimensions are considered beside those discussed herein.

In the present embodiment, the first dimension considered in deciding upon a reserve price choice is the multiplicity of end users. The decision maker deciding on a reserve price may be a seller, selling a number of items through the auction. Alternatively, the decision maker deciding upon a reserve price may be a buyer, buying a number of items through an auction.

A multiplicity of evaluation criteria may be employed by the decision-making end user to evaluate potential outcomes of alternative levels of the decision variable. For example, a seller may, in one instance, be interested in expected short-term profit from the auction. Alternatively, a seller may, in another instance, be interested in long-term outcomes. In the latter instance, the seller may take into account, and/or give more weight to the long-term strategic responses of potential participants in the auction.

One critical dimension, in the present embodiment, is the multiplicity of auction formats. The optimal reserve price can, in principle, vary with the other parameters of the auction procedure. For example, the optimal reserve price may differ between a sealed-bid first-price format and an English format.

Next, the available data may have a wide range of possible configurations. Data on past auctions may vary in terms of observable variables. For instance, some data sets may contain all bids. Others may contain on the transaction price. Some data sets may contain information on bids under various auction formats, whereas other data sets may have limited variation with respect to the auction format. In one instance, a data set may contain the number of bidders, or the number of potential bidders. In another instance, the number of potential bidders may not be observable, and thus no data may be available in that dimension.

Finally, in the present embodiment, the multiplicity of latent environments is considered. The distribution of bidder valuations varies from item to item. The framework for providing decision support for the auctioning of a wide range of products and services effectuated in the present embodiment allows a large class of possible value distributions.

The present embodiment addresses all of these potential sources of variation in the decision-making context to advance to the decision-maker sound advisory information in each possible situation. Thus, an integrated framework to solve decision problems related to the choice of a reserve price in a variety of auction situations is effectuated.

Exemplary User Interface

In FIG. 12 a screen shot of an exemplary graphical user interface (GUI) 1200 is depicted as it appears on a computer's display device. It is appreciated that GUI 1200 may be deployed in any on-screen, or other user-enabling format, not limited to the display depicted. In the present example, a specification field 1201 displays to a user a text input field or a pull-down menu for the user to select the item to be auctioned. The specification fields 1202 through are used to receive the user inputs on various parameters and constraints on the reserve price decision. In the present example, the on-screen button 1208 accepts the information entered by the user in to appropriate fields by the user. On-screen button 1209 clears all information entered into the input fields. It is appreciated that both the contents and the form of the user interface depicted in FIG. 12 is exemplary and other fields and buttons may be included or substituted for the exemplary fields and buttons depicted herein.

Exemplary Process

By way of illustration, a seller who wishes to sell one unit of an item through a sealed bid first-price auction is considered. For the purposes of illustrating the process of determining the optimal reserve price, the seller's evaluation criterion is taken to be expected profit and his valuation of the item is taken to be $V_S$. In the following, we will consider three examples to illustrate the operation of bidding behavior prediction and expected payoff prediction. In these examples, k symmetric bidders each with an independent private valuation for the item are considered. In the first example, the k bidders are assumed to be risk-neutral with valuations drawn from a distribution F(.). In other words, the structure extractor analyzing the data on past auctions of the same or similar items is assumed, by way of illustrating the process of reserve price determination, to output an estimated utility function U(w) which is linear in wealth, and a valuation distribution function F(.) which is independent and identical across bidders.

In the case of sealed-bid first-price auction (FPA) with a reserve-price r, a bidder with valuation v, wherein v>r, and facing k-1 rival bidders is predicted to place a bid b of $$b=B(v, FPA, r, k, U(.), F(.))=v-\int_r^v F^{k-1}(x)dx/F^{k-1}(v).$$

In the special case of values uniformly distributed over the interval from 0 to a, so that F(x)=x/a, and a reserve price of 0, the bids are related to the valuations by the simple equation $$B(v, FPA, r, k, U(.), F(.))=v(k-1)/k.$$

In the second example, all the parameters are identical to the first example, except that the bidders are estimated by the structure extractor to be risk averse with a concave utility function given by $U(w)=w^r$, where r is a parameter between 0 and 1. In this case, a bidder with valuation v, wherein v>r, is predicted to bid $$B(v, FPA, r, k, U(.), F(.))=v-\int_r^v F^{k-1/\rho}(x)dx/F^{k-1/\rho}(v).$$

In a third instance, an auction the auction format specified by the seller is taken to be a sealed-bid second-price (i.e., Vickrey) auction (denote SPA in the sequel). In this instance, a bidder with valuation v, wherein v>r, is predicted to bid $$B(v, SPA, r, k, U(.), F(.))=v.$$

In this case, each bidder bids his valuation for the item.

In one embodiment of the present invention, the effect of the reserve price on the seller's payoff is considered. If the reserve price is set too low (e.g., zero), there is a chance that the item is sold at price less than $V_S$, the value of the item to the seller. If, on the other hand, the reserve price is set too high, then the item may not be sold. From the seller's point of view, the bids submitted by the bidders are random variables. Thus, the seller's payoff will be correspondingly random.

The seller's expected payoff depends on the auction rules, seller's own valuation of the item, bidders' bidding behavior and the structure of the environment, which, for the purposes of the present exemplary process, is represented by the two functions U(.) and F(.). In the following the notation p will be used to denote the seller's payoff, which, in the present example, is taken to be the seller's profit.

According to the rules of the sealed-bid first-price auction, the seller's payoff will be a random variable that takes the value $V_S$ if the maximum valuation among the k bidder valuations is less than the reserve price r, and the value $B(V_{max})$ otherwise, where $V_{max}$ is the maximum of k independent valuations each with distribution F(.). That is, the seller's payoff will be a random variable defined as follows $$\pi(r, FPA, k, U(.), F(.), V_S) = V_S \text{ if } V_{max} < r$$
$$= B(V_{max}) \text{ otherwise.}$$

In the case of sealed-bid second-price auction, the random variable that defines the seller's payoff is obtained as follows. Given the rules of the second-price auction, the seller's payoff will be $V_S$ if $V_{max} < r$. If $V_{max} > r$, then the price obtained by the seller for the item depends on the second highest valuation among the k valuations. Denote this value by $V_{SEC}$. Then, the seller obtains r for the item if $V_{SEC}$ is less than r, he obtains $V_{SEC}$ if $r < V_{SEC}$. Thus, the seller's payoff under a sealed-bid second-price auction with a reserve price r is the random variable defined by $$\pi(r, SPA, k, U(.), F(.), V_S) = V_S \text{ if } V_{max} < r$$
$$= r \text{ if } V_{SEC} < r < V_{max}$$
$$= V_{SEC} \text{ if } r < V_{SEC}.$$

Thus, the probability distribution of the seller's payoff at a given reserve price r can be obtained by simulation methods. For each possible value of the decision variable r, the outcome prediction submodule 32 (FIG. 3) of the reserve price selector module 14 (FIG. 1) generates the probability distribution of the seller's payoff by using the estimated structural elements U(.) and F(.) to generate simulations of the random variables $V_{max}$, $V_{SEC}$, and $B(V_{max})$ in the expressions that define the seller's payoff. The probability distribution of the seller's payoff is then passed to the optimal decision submodule 33 (FIG. 3) of the reserve price selector module 14 (FIG. 1). For each reserve price level in the range specified by the seller, the optimal decision submodule 33 then computes the descriptive statistics (mean and standard deviation) of the seller's payoff. In one embodiment of the present invention, the optimal decision submodule 33 then outputs these descriptive statistics as well as the reserve price with the highest expected payoff to the report generator 15 of FIG. 1. In an alternative embodiment, the reserve price with highest expected payoff is outputted to an external auction implementation system so that the item is auctioned with the reported reserve price.

In the first and second examples above, the seller's expected payoff, Ep, is formulated as follows:

$$E\pi(r, FPA, k, U(.), F(.), V_S) = V_S H(r) + \int_r^v B(t, FPA, r, k, U(.), F(.)) H'(t) dt$$

where H(.) is the distribution function of the maximum of k independent valuations, and H'(.) is the corresponding density function. The functions H(.) and H'(.) can be obtained from the function F(.) by well-known methods of probability theory. This formulation follows from the fact that, under the rules of the sealed-bid first-price auction the highest bidder wins the item and pays his bid. According to the predicted bidding behavior, the highest bidder is the bidder with the highest valuation. Thus, if the highest valuation among the k bidders is less than the reserve price there will be no sale in which case the seller ends up with the item that is worth $V_S$ to him. If the highest valuation among the k bidders exceeds $V_S$ then the price obtained by the seller is the bid submitted by the bidder with the highest valuation.

In the third example, wherein the auction format is sealed-bid second-price (SPA), the seller's expected profit is obtained as $$Ep(r, SPA, k, U(.), F(.), V_S) = V_S H(r) + rE(r) + \int_r^v tD'(t)dt$$

where the functions H(.), E(.) and D(.) are obtained from the function F(.) as follows. The function H(.), as in the above example, is the distribution of the maximum of k independent valuations each with distribution F(.). The function E(r) is the probability that the highest valuation among k valuations is above r and the second highest is below r. The function D'(.) is the derivative of the function D(.), which, in turn, is the distribution of the second highest valuation among k independent valuations each with distribution F(.). Both E(.) and D(.) can be obtained from the function F(.) by employing well-known methods of probability theory.

Thus, alternative levels of the reserve price can be evaluated in terms of the seller's expected payoff by employing the appropriate expression for the specific auction formats specified by the end user of the system. In one embodiment, this can be achieved by considering a discrete grid of m possible reserve price values, $r_1, r_2, \ldots, r_m$, and obtaining the seller's expected payoff for each $r_i$.

Exemplary Report

With reference to FIG. 13, formal reserve price report 1300 represents the information for the seller in a series of tables. It is appreciated that the report format may take another form. In inputs table 1310, dimensional information by the end user is displayed. In the present embodiment, the item specified by the seller is shown to be ABlueCar. The auction format given is shown to be a sealed-bid first-price auction. The number of bidders is inputted to be 5. The number of units to be sold is inputted to be 1. The seller's valuation of the item is shown to be $10. Furthermore, the seller inputs the constraint that the reserve price should be between 0 and $100.

In the results table 1320, the descriptive statistics (mean and standard deviation) of the seller's payoff is reported for various alternative levels of the reserve price.

Finally, the optimal decision table 1330 reports the reserve price with the maximum expected payoff as well as the corresponding payoff level and the associated standard deviation.

The report generator may report the same or similar report content in the form of a graphical report 1400 as in FIG. 14 wherein the seller's expected payoffs as well as various other payoff-related variables of potential interest corresponding to various reserve price levels are presented. It is appreciated that both the content and the form of the graphical report may vary.

Exemplary Overall Process

Figure 15:
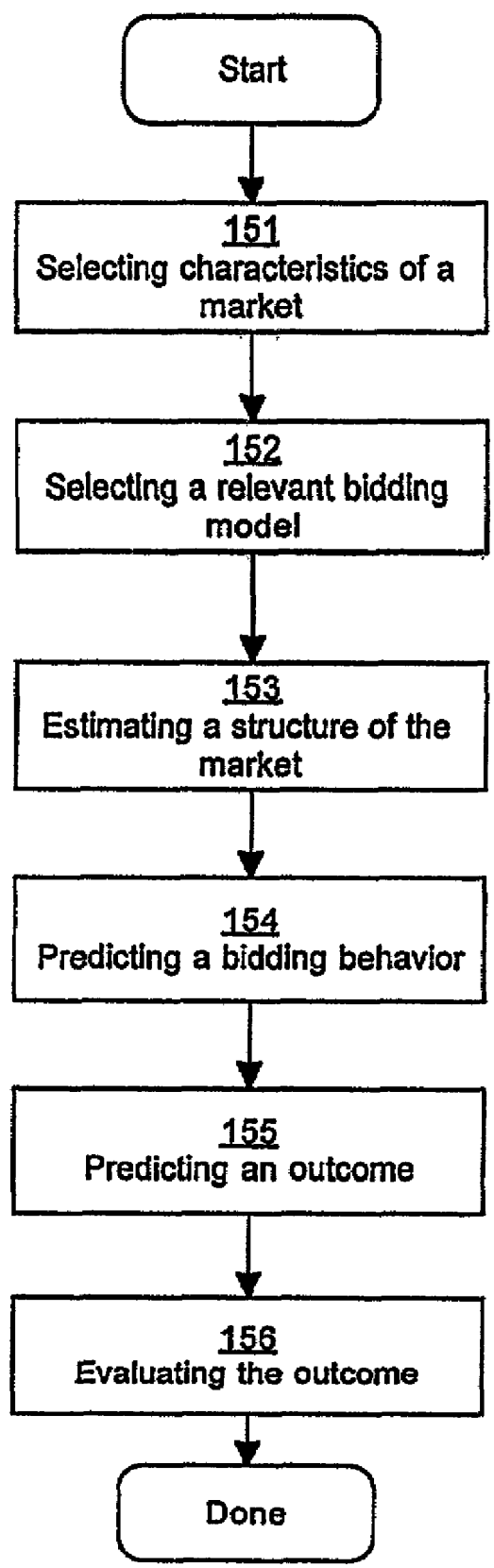
FIG. 15 is a flowchart of the steps in a process for calculating the optimal reserve price in an auction market, in accordance with one embodiment of the present invention.
Figure 1:
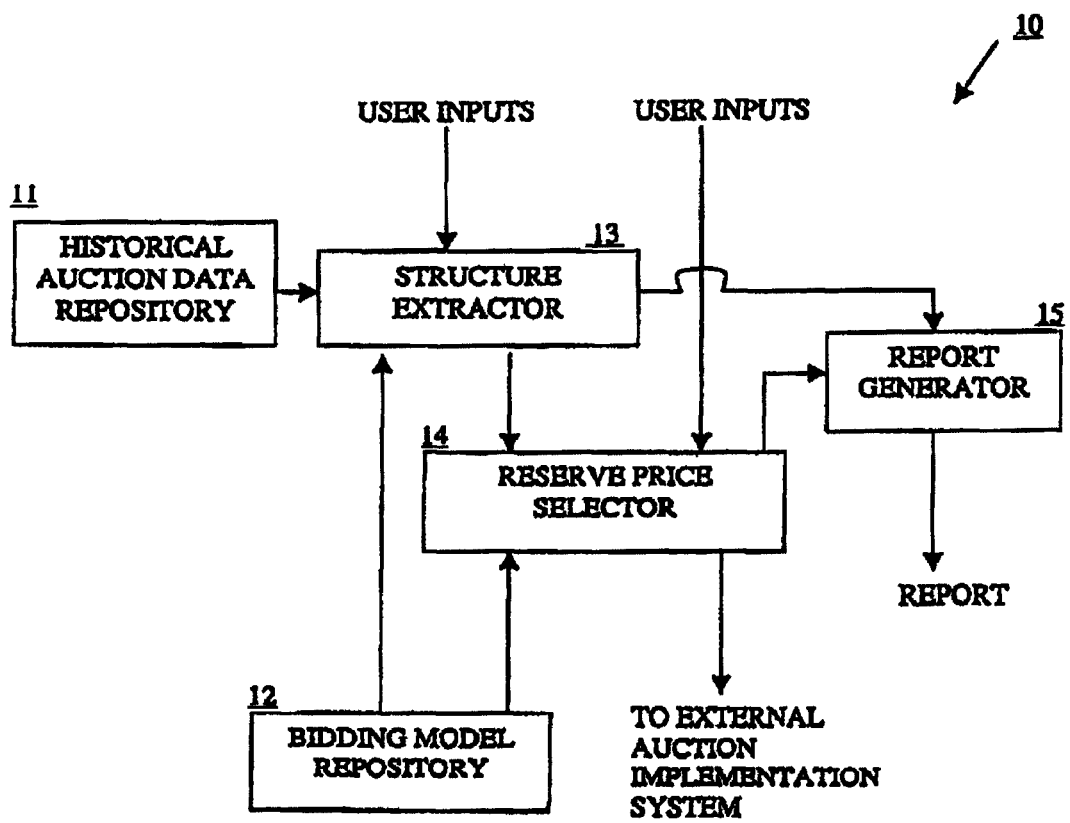
Figure 2:
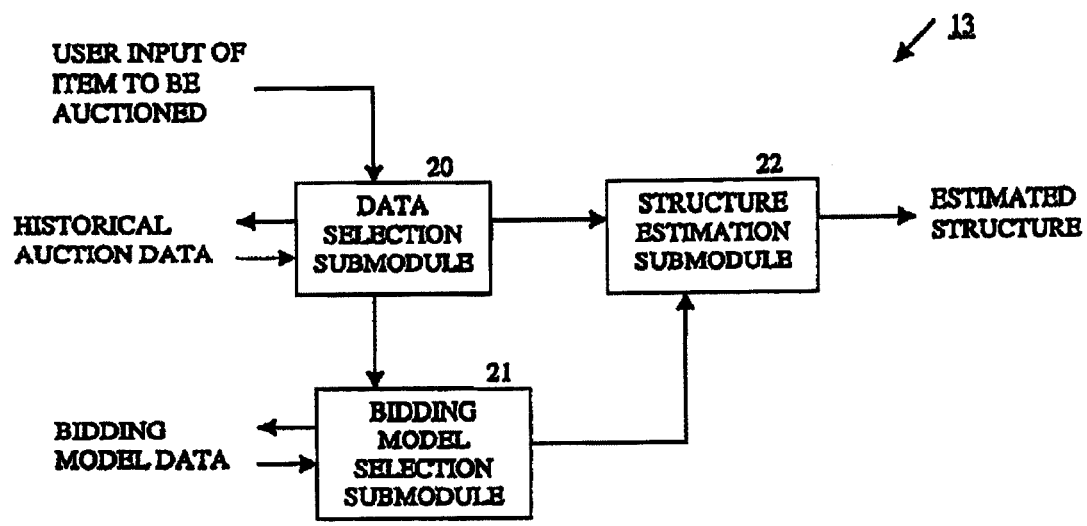
Figure 3:
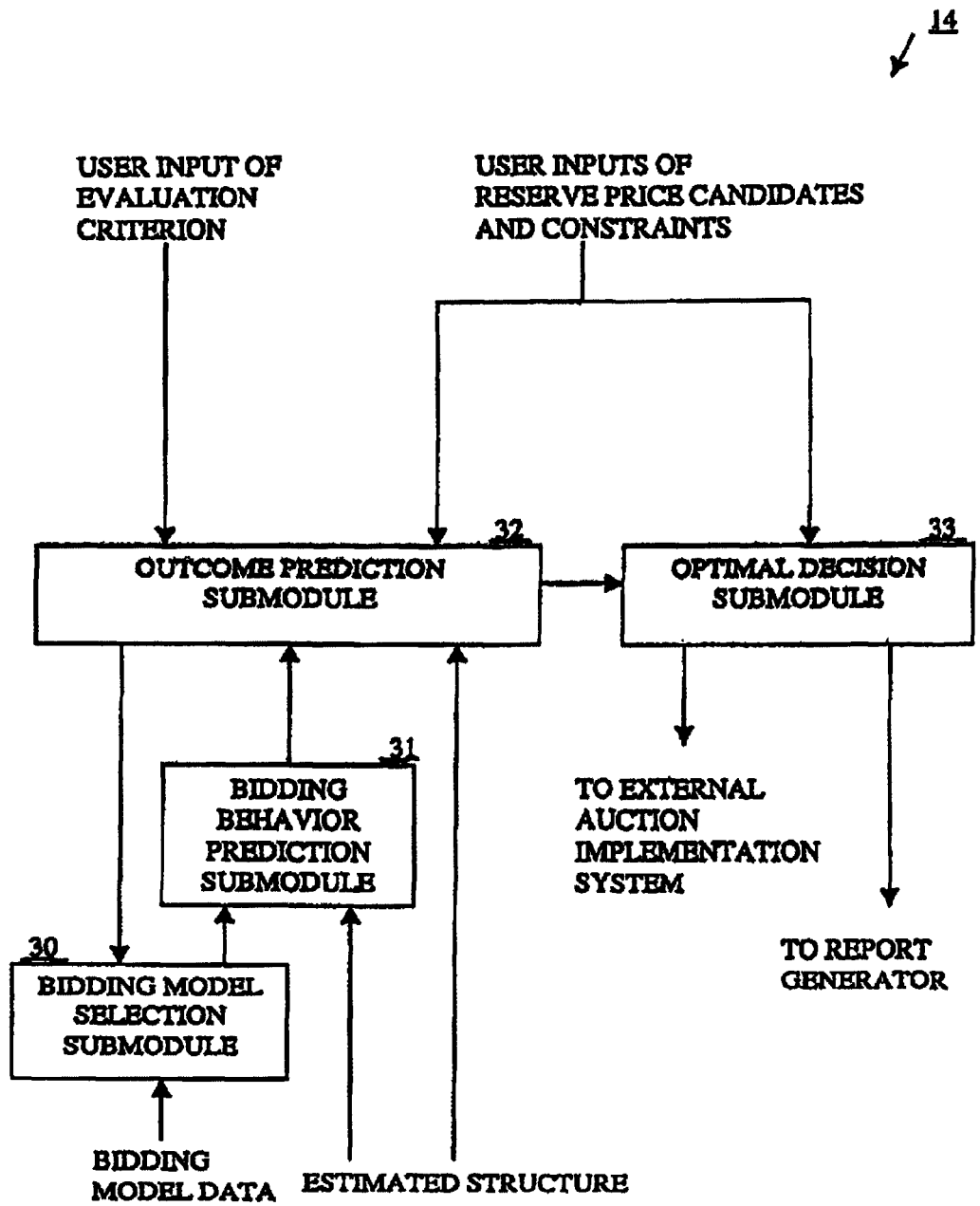
Figure 4:
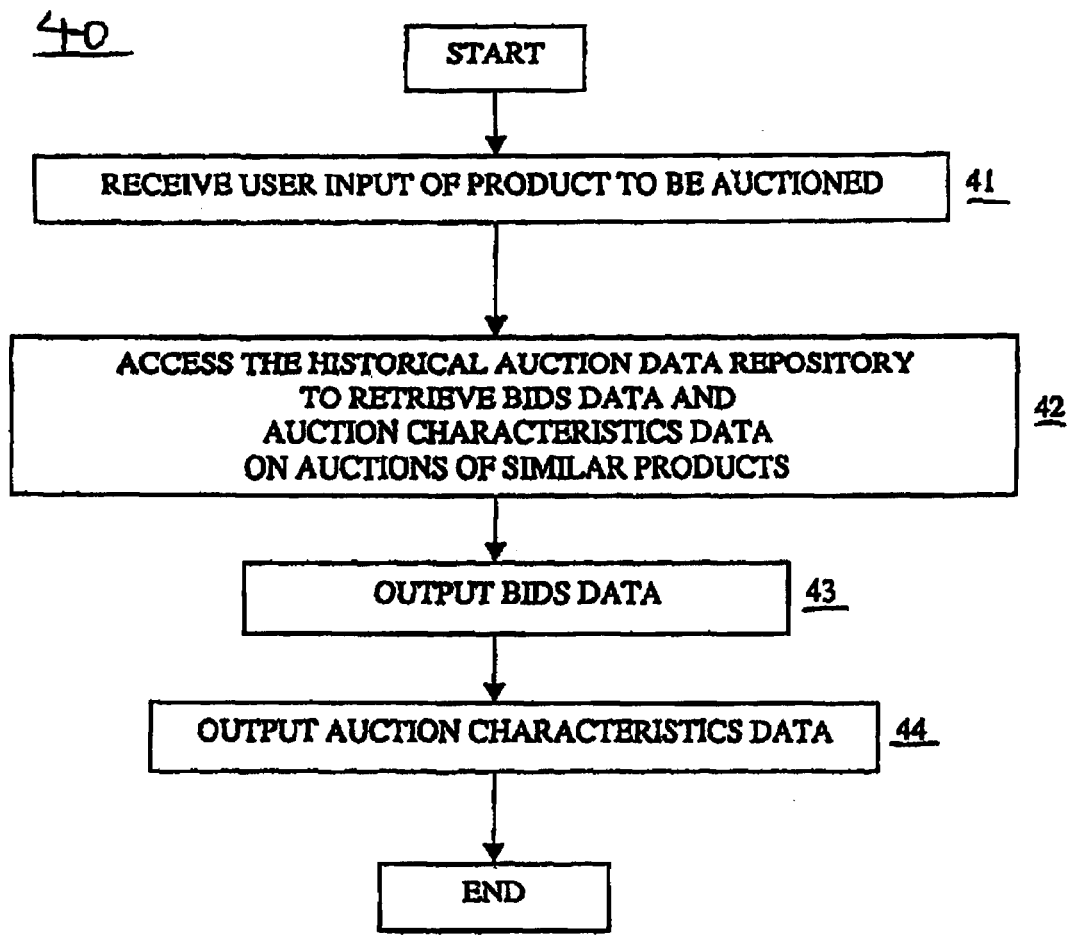
Figure 5:
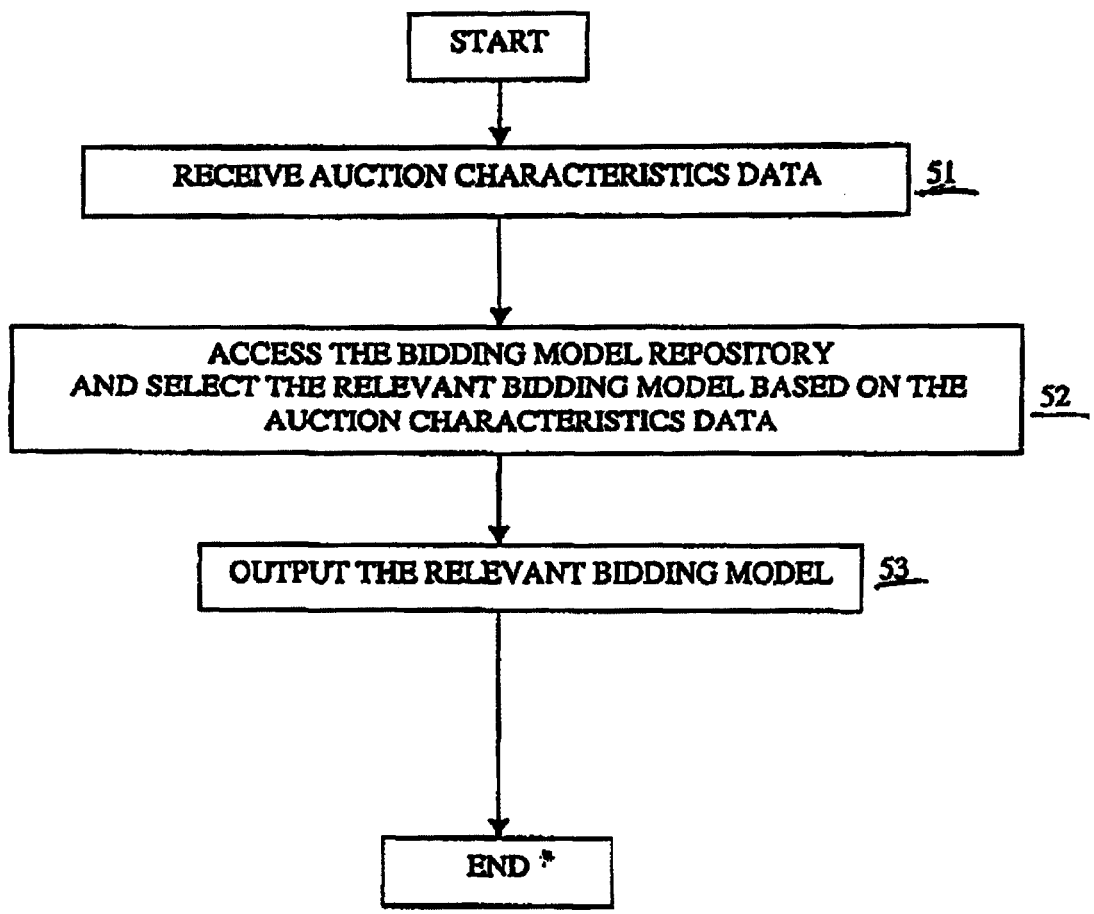
Figure 6:
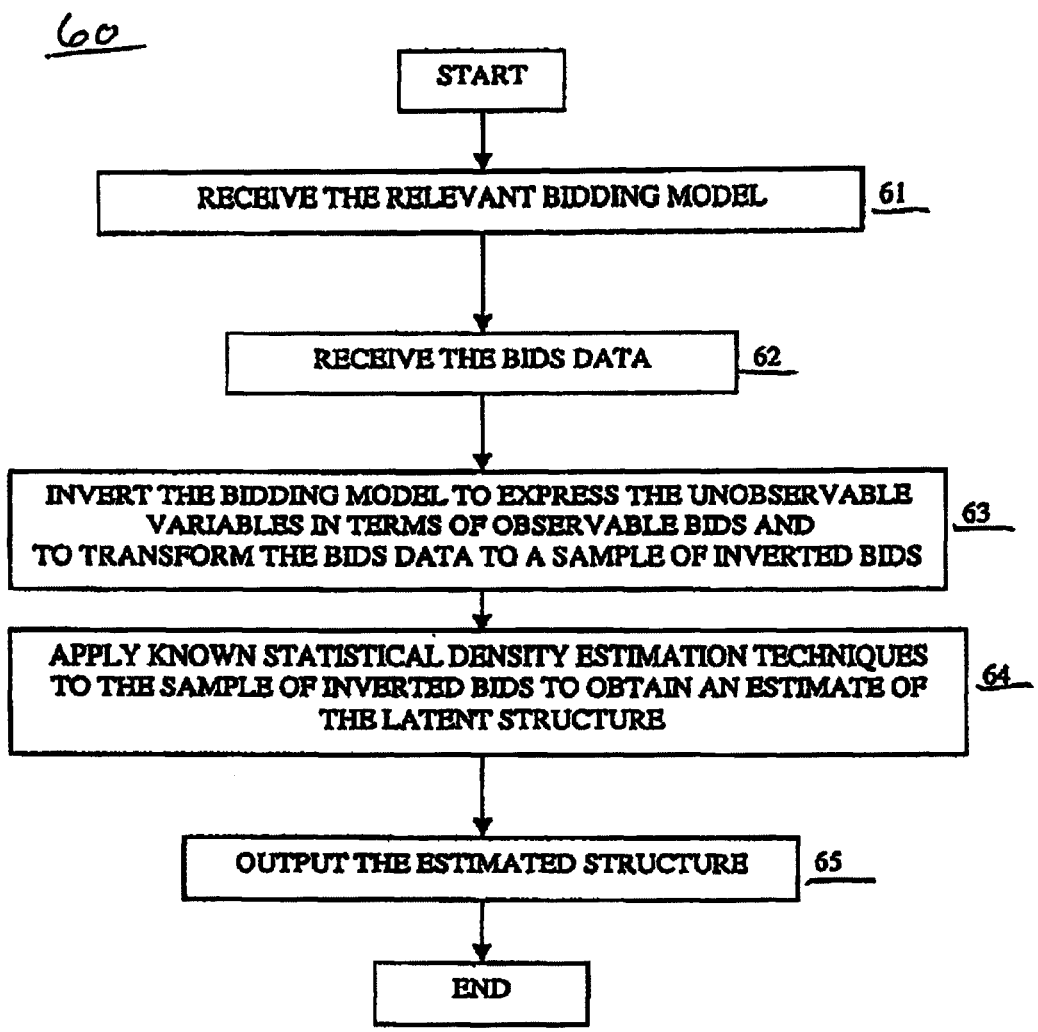
Figure 7:
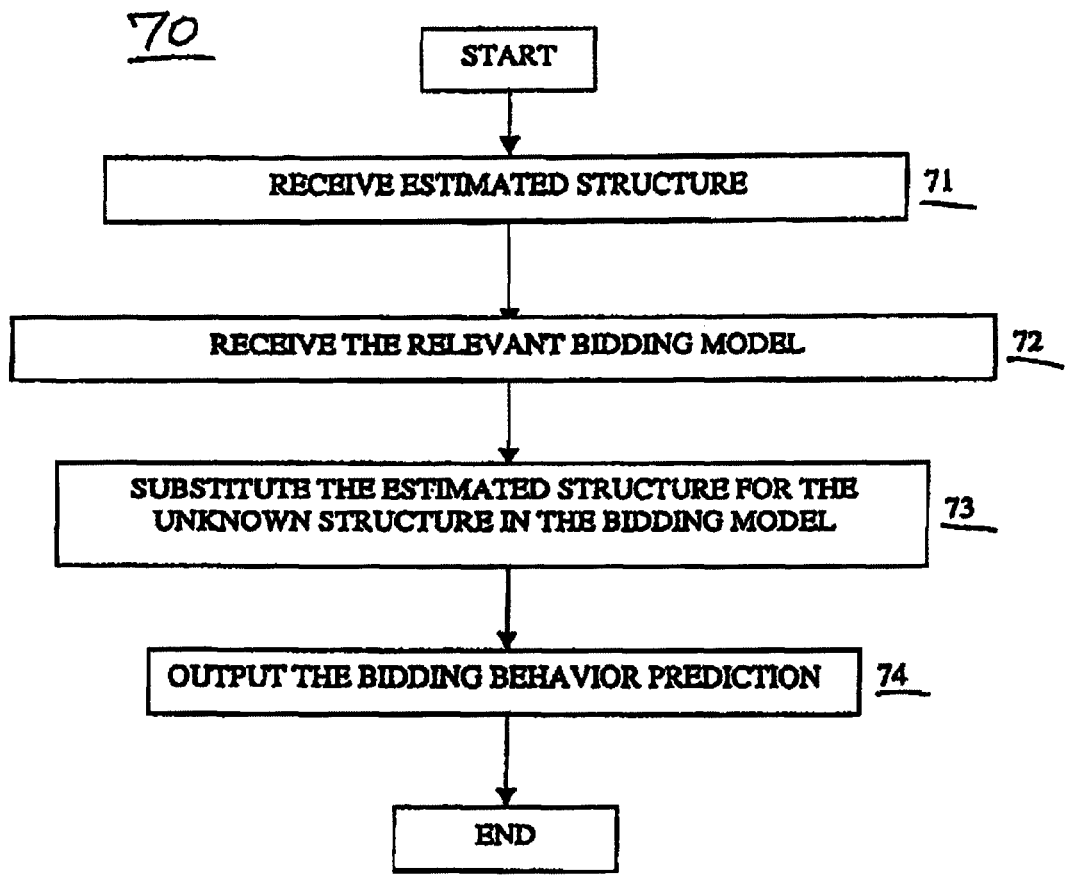
Figure 8:
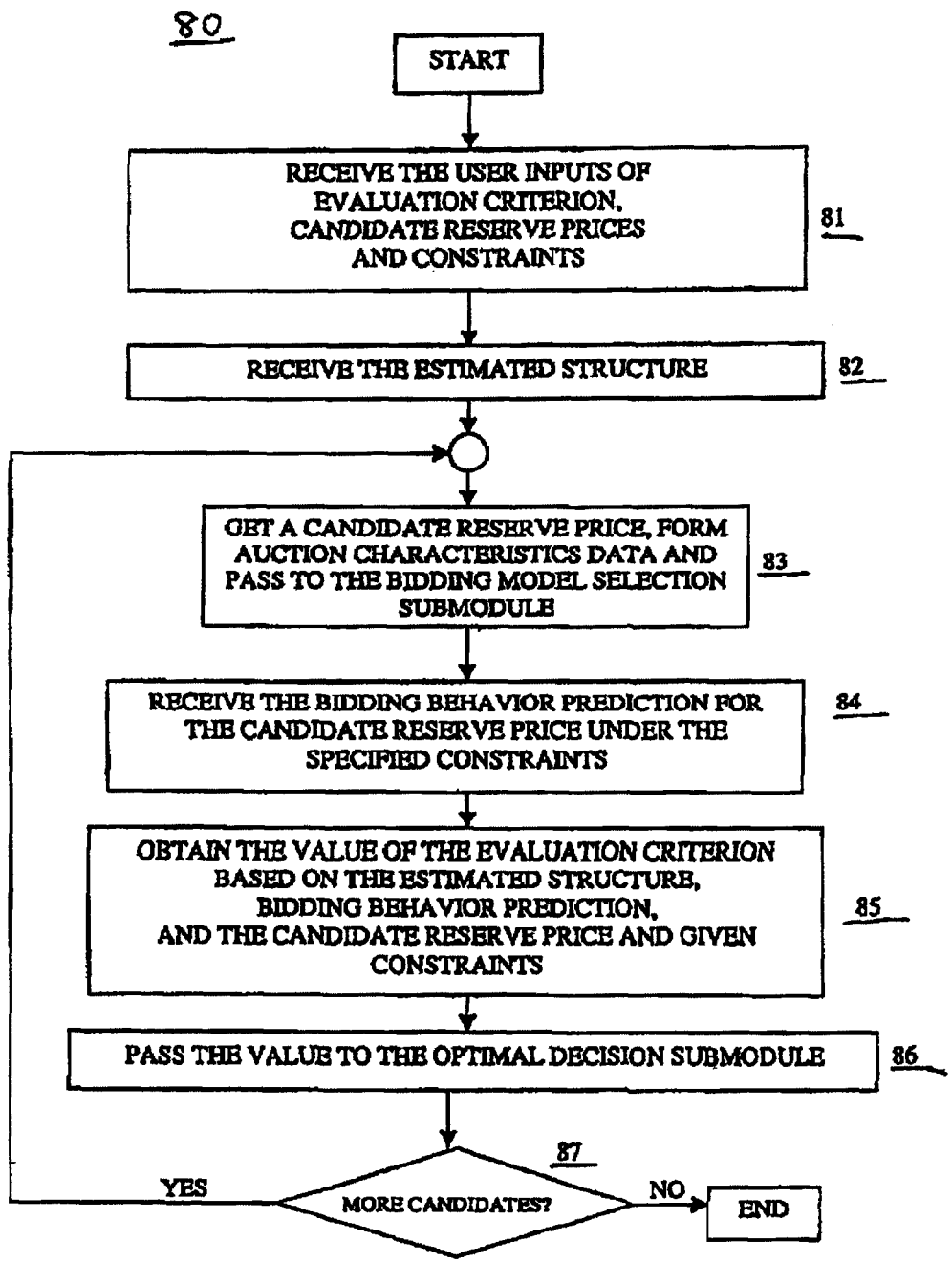
Figure 9:
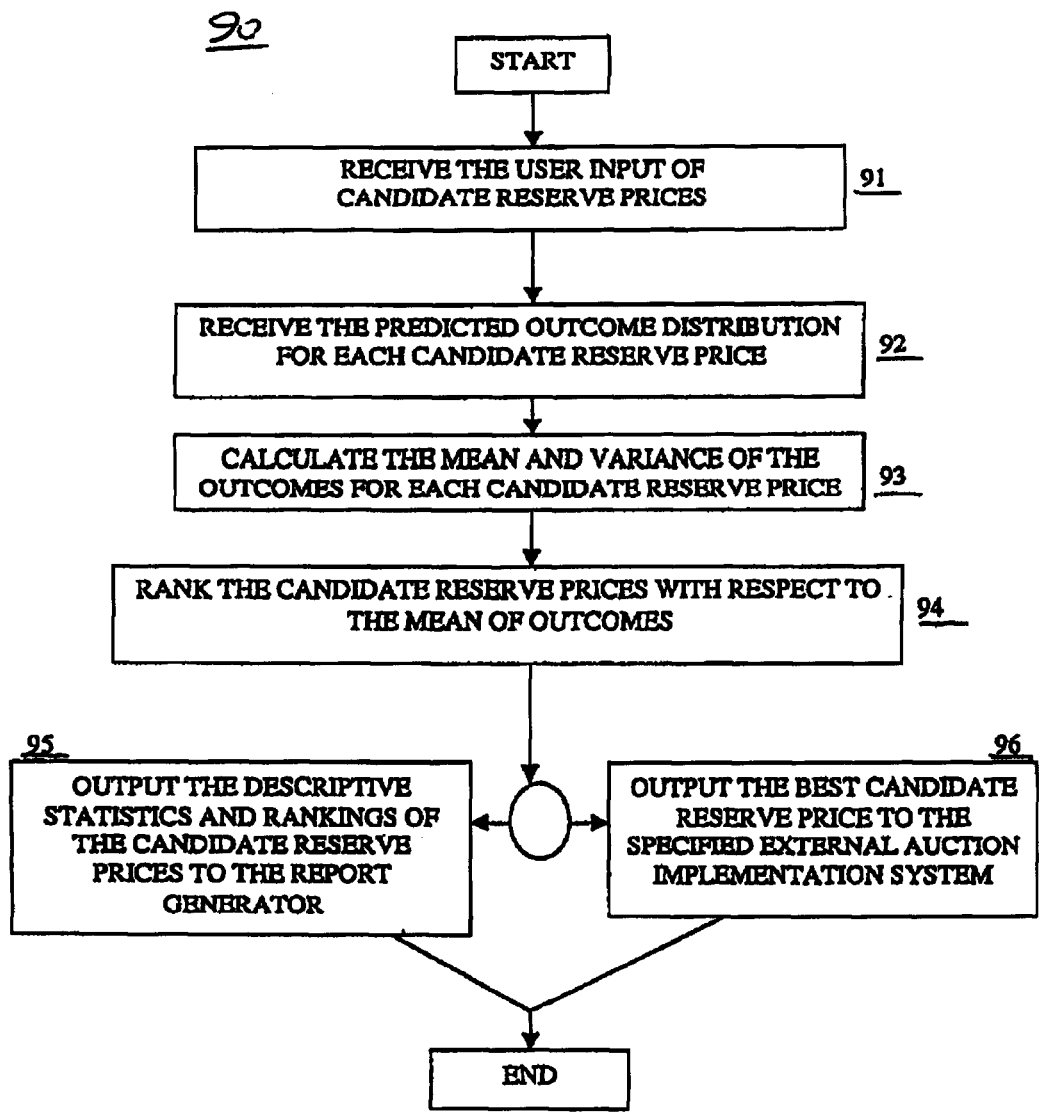
Figure 10:
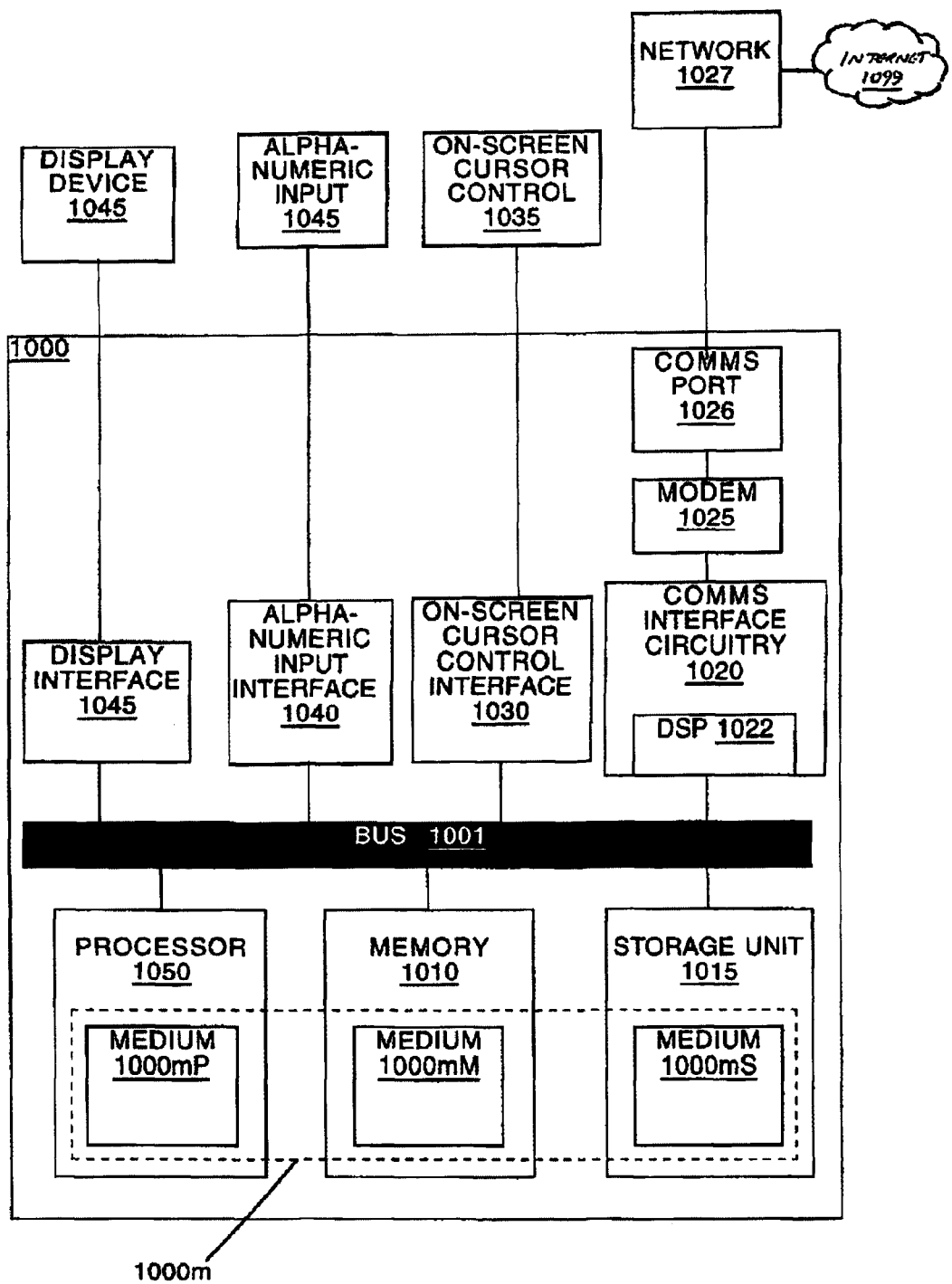

FIG. 15 illustrates the steps in a process 150 for calculating the optimal reserve price for an auction market, in accordance with one embodiment of the present invention. At step 151 of process 150, characteristics of the market are selected. Step 151 is described above in detail in process 40 of FIG. 4. At step 152, a relevant bidding model is selected. Step 152 is described above in detail in process 50 of FIG. 5. At step 153, a structure of said market is estimated. Step 153 is described above in detail in process 60 of FIG. 6. At step 154, a bidding behavior is predicted. Step 154 is described above in detail in process 70 of FIG. 7. At step 155, a first outcome of the market is predicted. Step 155 is described above in detail in process 80 of FIG. 8. At step 156, the first outcome of the market is evaluated. Step 156 is described above in detail in process 90 of FIG. 9.

In summary, the present invention provides a method and system that determines the optimal reserve price for an auction, with respect to a multiplicity of possible evaluation criteria that end users specify. In one embodiment, structural elements characterizing the auction situation are estimated from data available on past auctions. In one embodiment, structural analysis of bid data from prior auctions identifies and estimates the distributions of bidders' private signals. In one embodiment, this method is implemented by a process executed on a computer system, under the control of software and firmware directing the operation of its processor and other components. In one embodiment, a computer readable medium causes a computer system to execute the steps in a process for implementing the method.

An embodiment of the present invention, a method and system for determining an optimal reserve price for an auction, is thus described. While the present invention has been described in particular embodiments, it should be appreciated that the present invention should not be construed as limited by such embodiments, but rather construed according to the following claims.

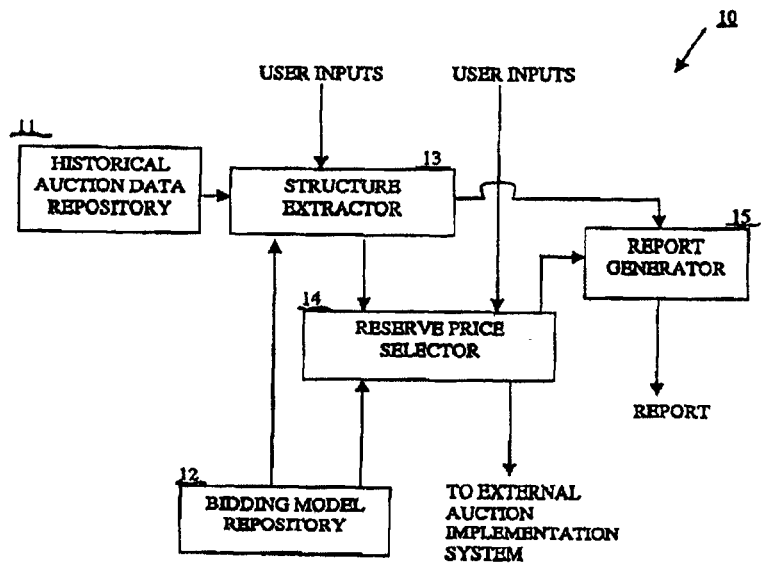

What is claimed is:

1. A method for determining a reserve price for a market, said method comprising:
    selecting characteristics of said market;
    selecting a relevant bidding model;
    estimating a structure of said market, said estimating comprises expressing unobservable variables in terms of observable bids, wherein said unobservable variables are expressed in terms of observable bids by inverting said bid model;
    predicting a bidding behavior;
    predicting a first outcome of said market; and
    evaluating said first outcome of said market.

2. The method as recited in claim 1, wherein said selecting characteristics further comprises:
    receiving a first user input, wherein said first user input comprises information identifying an item to be auctioned;
    accessing a database;
    retrieving from said database historical bids data;
    retrieving from said database auction characteristics data, wherein said auction characteristics comprise information relating to historical auctions of similar items;
    outputting said bids data; and
    outputting said auction characteristics data.

3. The method as recited in claim 1, wherein said selecting a relevant bidding model further comprises:
    receiving said auction characteristics data;
    accessing a database;
    retrieving from said database a relevant bidding model, wherein said bidding model is selected based on a corresponding relevance of said auction characteristics data; and
    outputting said relevant bidding model.

4. The method as recited in claim 1, wherein said estimating further comprises:
    receiving said relevant bidding model;
    receiving said bids data;
    transforming said bids data to a sample of inverted bids, wherein said bids data are transformed by inverting said bid model;
    estimating an estimated latent structure of said market, wherein said sample of inverted bids receives application of statistical density estimation techniques to obtain said estimated structure; and
    outputting said estimated structure.

5. The method as recited in claim 1, wherein said bidding model has embedded an unknown structure, and wherein said predicting a bidding behavior further comprises:
    receiving said estimated structure;
    receiving said relevant bidding model;
    substituting said estimated structure for said unknown structure; and
    outputting a prediction of bidding behavior.

6. The method as recited in claim 1, wherein said evaluating said first outcome further comprises:
    receiving a third user input, wherein said third user input comprises a plurality of candidate reserve prices;
    receiving a predicted outcome for each said candidate reserve price;
    calculating descriptive statistics for each said candidate reserve price, wherein said descriptive statistics comprise a mean and a variance;
    ranking each said candidate reserve price with respect to said calculated mean and generating corresponding rankings for said plurality; and
    outputting said descriptive statistics and said rankings.

7. The method as recited in claim 6, further comprising:
    selecting a best reserve price, wherein said best reserve price comprises the candidate reserve price within said plurality having the highest said ranking; and
    outputting said best reserve price.

8. The method as recited in claim 1, wherein said predicting a first outcome further comprises:
    receiving a second user input, wherein said second user input comprises:
        an evaluation criterion,
        a candidate reserve price, and
        a constraint;
    receiving said estimated structure;
    receiving said bidding behavior prediction for said candidate reserve price, wherein said bidding behavior prediction further comprises a prediction under said constraint;
    obtaining a value of said evaluation criterion, wherein said value is based on said estimated structure, said bidding behavior prediction, said candidate reserve price, and said constraint, said value comprising said first predicted outcome; and
    outputting said value.

9. A computer system comprising:
    a bus;
    a memory interconnected with said bus; and
    a processor interconnected with said bus, wherein said processor executes a method for determining a reserve price for a market, said method comprising:
    selecting characteristics of said market;
    selecting a relevant bidding model;
    estimating a structure of said market, said estimating comprises expressing unobservable variables in terms of observable bids, wherein said unobservable variables are expressed in terms of observable bids by inverting said bid model;
predicting a bidding behavior;
predicting a first outcome of said market; and
evaluating said first outcome of said market.

10. The system as recited in claim 9, wherein said selecting characteristics of said method further comprises:
receiving a first user input, wherein said first user input comprises information identifying an item to be auctioned;
accessing a database;
retrieving from said database historical bids data;
retrieving from said database auction characteristics data, wherein said auction characteristics comprise information relating to historical auctions of similar items;
outputting said bids data; and
outputting said auction characteristics data.

11. The system as recited in claim 9, wherein said selecting a relevant bidding model of said method further comprises:
receiving said auction characteristics data;
accessing a database;
retrieving from said database a relevant bidding model, wherein said bidding model is selected based on a corresponding relevance of said auction characteristics data; and
outputting said relevant bidding model.

12. The system as recited in claim 9, wherein said estimating of said method further comprises:
receiving said relevant bidding model;
receiving bids data;
transforming said bids data to a sample of inverted bids, wherein said bids data are transformed by inverting said bid model;
estimating an estimated latent structure of said market, wherein said sample of inverted bids receives application of statistical density estimation techniques to obtain said estimated structure; and
outputting said estimated structure.

13. The system as recited in claim 9, wherein said bidding model has embedded an unknown structure, and wherein said predicting a bidding behavior of said method further comprises:
receiving said estimated structure;
receiving said relevant bidding model;
substituting said estimated structure for said unknown structure; and
outputting a prediction of bidding behavior.

14. The system as recited in claim 9, wherein said evaluating said first outcome of said method further comprises:
receiving a third user input, wherein said third user input comprises a plurality of candidate reserve prices;
receiving a predicted outcome for each said candidate reserve price;
calculating descriptive statistics for each said candidate reserve price, wherein said descriptive statistics comprise a mean and a variance;
ranking each said candidate reserve price with respect to said calculated mean and generating corresponding rankings for said plurality; and
outputting said descriptive statistics and said rankings.

15. The system as recited in claim 14, wherein said evaluating said first outcome of said method further comprises:
selecting a best reserve price, wherein said best reserve price comprises the candidate reserve price within said plurality having the highest said ranking; and
outputting said best reserve price.

16. The system as recited in claim 9, wherein said predicting a first outcome of said method further comprises:
receiving a second user input, wherein said second user input comprises:
an evaluation criterion,
a candidate reserve price, and
a constraint;
receiving said estimated structure;
receiving said bidding behavior prediction for said candidate reserve price, wherein said bidding behavior prediction further comprises a prediction under said constraint;
obtaining a value of said evaluation criterion, wherein said value is based on said estimated structure, said bidding behavior prediction, said candidate reserve price, and said constraint, said value comprising said first predicted outcome; and
outputting said value.

17. A computer readable medium for causing a computer system to execute a method for determining a reserve price for a market, said method comprising:
selecting characteristics of said market;
selecting a relevant bidding model;
estimating a structure of said market, said estimating comprises expressing unobservable variables in terms of observable bids, wherein said unobservable variables are expressed in terms of observable bids by inverting said bid model;
predicting a bidding behavior;
predicting a first outcome of said market; and
evaluating said first outcome of said market.

18. The computer readable medium as recited in claim 17, wherein said selecting characteristics of said method further comprises:
receiving a first user input, wherein said first user input comprises information identifying an item to be auctioned;
accessing a database;
retrieving from said database historical bids data;
retrieving from said database auction characteristics data, wherein said auction characteristics comprise information relating to historical auctions of similar items;
outputting said bids data; and
outputting said auction characteristics data.

19. The computer readable medium as recited in claim 17, wherein said selecting a relevant bidding model of said method further comprises:
receiving said auction characteristics data;
accessing a database;
retrieving from said database a relevant bidding model, wherein said bidding model is selected based on a corresponding relevance of said auction characteristics data; and
outputting said relevant bidding model.

20. The computer readable medium as recited in claim 17, wherein said estimating of said method further comprises:
receiving said relevant bidding model;
receiving bids data;
transforming said bids data to a sample of inverted bids, wherein said bids data are transformed by inverting said bid model;
estimating an estimated latent structure of said market, wherein said sample of inverted bids receives application of statistical density estimation techniques to obtain said estimated structure; and
outputting said estimated structure.

21. The computer readable medium as recited in claim 17, wherein said bidding model has embedded an unknown structure, and wherein said predicting a bidding behavior of said method further comprises:
   receiving said estimated structure;
   receiving said relevant bidding model;
   substituting said estimated structure for said unknown structure; and
   outputting a prediction of bidding behavior.

22. The computer readable medium as recited in claim 17, wherein said evaluating said first outcome of said method further comprises:
   receiving a third user input, wherein said third user input comprises a plurality of candidate reserve prices;
   receiving a predicted outcome for each said candidate reserve price;
   calculating descriptive statistics for each said candidate reserve price, wherein said descriptive statistics comprise a mean and a variance;
   ranking each said candidate reserve price with respect to said calculated mean and generating corresponding rankings for said plurality; and
   outputting said descriptive statistics and said rankings.

23. The computer readable medium as recited in claim 22, wherein said evaluating said first outcome of said method further comprises:
   selecting a best reserve price, wherein said best reserve price comprises the candidate reserve price within said plurality having the highest said ranking; and
   outputting said best reserve price.

24. The computer readable medium as recited in claim 17, wherein said predicting a first outcome of said method further comprises:
   receiving a second user input, wherein said second user input comprises:
      an evaluation criterion,
      a candidate reserve price, and
      a constraint;
   receiving said estimated structure;
   receiving said bidding behavior prediction for said candidate reserve price, wherein said bidding behavior prediction further comprises a prediction under said constraint;
   obtaining a value of said evaluation criterion, wherein said value is based on said estimated structure, said bidding behavior prediction, said candidate reserve price, and said constraint, said value comprising said first predicted outcome; and
   outputting said value.

* * * * *

UNITED STATES PATENT AND TRADEMARK OFFICE
CERTIFICATE OF CORRECTION

PATENT NO. : 7,493,280 B2  
APPLICATION NO. : 09/902928  
DATED : February 17, 2009  
INVENTOR(S) : Kemal Guler et al.

Page 1 of 13

It is certified that error appears in the above-identified patent and that said Letters Patent is hereby corrected as shown below:

On the Title Page

Below item (57) Abstract, replace "24 claims, 20 Drawing Sheets" with --24 claims, 11 Drawing Sheets--.

In the Drawings

In the drawings, delete drawing sheets 11-16 of 20 consisting of figs. 11A to 11F and replace therefor drawing sheet 11 having replacement fig. 11 as shown on the attached page 2 of 2, replacement drawing sheet 11 of 11.

The set of drawings have been replaced to reflect figs. 1-11 as shown on attached new set of drawings having 11 drawing sheets.

In col. 22, line 4, in claim 4, after "receiving" delete "said".

Signed and Sealed this  
Twenty-eighth Day of August, 2012

David J. Kappos  
*Director of the United States Patent and Trademark Office*

(12) United States Patent
Guler et al.

(10) Patent No.: US 7,493,280 B2
(45) Date of Patent: *Feb. 17, 2009

(54) METHOD AND SYSTEM FOR SETTING AN OPTIMAL RESERVE PRICE FOR AN AUCTION

(75) Inventors: Kemal Guler, Cupertino, CA (US); Tongwei Liu, Redwood City, CA (US); Hsiu-Khuern Tang, Menlo Park, CA (US); Kay-Yut Chen, Sunnyvale, CA (US); Fereydoon Safai, Los Altos Hills, CA (US); Ren Wu, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1642 days.

This patent is subject to a terminal disclaimer.

(21) Appl. No.: 09/902,928

(22) Filed: Jul. 10, 2001

(65) Prior Publication Data
US 2003/0055773 A1 Mar. 20, 2003

(51) Int. Cl.
G06Q 40/00 (2006.01)
(52) U.S. Cl. .............................. 705/37; 705/35
(58) Field of Classification Search ............... 705/37, 705/36 R, 27, 80, 26
See application file for complete search history.

(56) References Cited
U.S. PATENT DOCUMENTS
6,415,270 B1 * 7/2002 Rackson et al. ........... 705/36 R 6,871,190 B1 * 3/2005 Seymour et al. ........... 705/37

FOREIGN PATENT DOCUMENTS
EP 1085445 A1 * 3/2001

OTHER PUBLICATIONS
Bulow et al (The Journal of political economy, vol. 97, No. 5. (Oct. 1989), pp. 1060-1090).*

* cited by examiner

Primary Examiner—Thomas A. Dixon
Assistant Examiner—Ojo O. Oyebisi

(57) ABSTRACT

One embodiment of the present invention provides a method and system that computes the optimal level of the reserve price for an auction, with respect to a multiplicity of possible evaluation criteria that the end user of the system may specify. In one embodiment, structural elements characterizing the auction situation are estimated from bid data available on past auctions. The estimated structural elements are then used in the formulation of the user's expected payoff as a function of the reserve price. This objective function is then optimized to obtain the best level of the reserve price. In one embodiment, this method is implemented by a process executed on a computer system, under the control of software and firmware directing the operation of its processors and components. In one embodiment, a computer readable medium causes a computer system to execute the steps in a process for implementing the method.

24 Claims, 11 Drawing Sheets